United States Patent
Cheng et al.

(10) Patent No.: US 11,838,956 B2
(45) Date of Patent: Dec. 5, 2023

(54) TECHNIQUES FOR PRIORITIZING MULTIPLE SETS OF RANDOM ACCESS CHANNEL PARAMETERS

(71) Applicant: QUALCOMM Incorporated, San Diego, CA (US)

(72) Inventors: Peng Cheng, Beijing (CN); Linhai He, San Diego, CA (US); Jianhua Liu, Beijing (CN); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/898,231

(22) Filed: Aug. 29, 2022

(65) Prior Publication Data

US 2022/0408498 A1 Dec. 22, 2022

Related U.S. Application Data

(63) Continuation of application No. PCT/CN2021/084384, filed on Mar. 31, 2021.

(51) Int. Cl.
  *H04W 74/08* (2009.01)
  *H04W 76/19* (2018.01)
  *H04W 76/20* (2018.01)

(52) U.S. Cl.
  CPC ... *H04W 74/0875* (2013.01); *H04W 74/0816* (2013.01); *H04W 74/0833* (2013.01); *H04W 76/19* (2018.02); *H04W 76/20* (2018.02)

(58) Field of Classification Search
  CPC .............. H04W 16/00; H04W 74/008; H04W 74/0816; H04W 74/0833; H04W 74/0875; H04W 76/19; H04W 76/20
  See application file for complete search history.

(56) References Cited

U.S. PATENT DOCUMENTS

2018/0192426 A1\* 7/2018 Ryoo ................ H04W 74/0833
2018/0317264 A1\* 11/2018 Agiwal ............... H04W 74/085
(Continued)

FOREIGN PATENT DOCUMENTS

| CN | 105874726 A | 8/2016 |
| CN | 110268753 A | 9/2019 |
| WO | WO-2018232381 | 12/2018 |

OTHER PUBLICATIONS

CMCC: "Report of [AT113-e][252][Slicing] Conclusions on Slice-Based RACH Configuration", 3GPP Draft, 3GPP TSG-RAN WG2 Meeting #113 electronic, R2-2101975, Online, Jan. 25-Feb. 5, 2021, pp. 1-19.

(Continued)

*Primary Examiner* — Kashif Siddiqui
(74) *Attorney, Agent, or Firm* — QUALCOMM Incorporated

(57) ABSTRACT

Methods, systems, and devices for wireless communications are described. A user equipment (UE) may receive an indication of a configuration for multiple sets of prioritization parameters for a random access channel (RACH) procedure. A first set of prioritization parameters of the multiple sets of prioritization parameters may be associated with a higher priority network slice than the other sets of prioritization parameters (e.g., than the remaining sets of prioritization parameters). The UE may detect a trigger to perform a RACH procedure and select the first set of prioritization parameters for the RACH procedure based on the first set of prioritization parameters being associated with the higher priority network slice. The UE may perform the RACH procedure for the network slice according to the first set of prioritization parameters.

30 Claims, 15 Drawing Sheets

(56) References Cited

U.S. PATENT DOCUMENTS

| | | | |
|---|---|---|---|
| 2018/0368179 A1* | 12/2018 | He | H04W 74/008 |
| 2019/0289528 A1* | 9/2019 | Lou | H04W 48/10 |
| 2019/0289534 A1* | 9/2019 | Ryoo | H04W 72/0446 |
| 2021/0112513 A1* | 4/2021 | Chun | H04W 48/18 |

OTHER PUBLICATIONS

International Search Report and Written Opinion—PCT/CN2021/084384—ISA/EPO—dated Dec. 29, 2021.
Nokia, Nokia Shanghai Bell: "RACH Prioritisation for Slices", 3GPP Draft, 3GPP TSG-RAN WG2 Meeting #113 Electronic, R2-2100599 (R2-2009423), Elbonia, Jan. 25-Feb. 5, 2021, 4 Pages.
Qualcomm Incorporated: "Discussion on Candidate Solutions of Slice-Based RACH", 3GPP Draft, 3GPP TSG RAN WG2 Meeting #113-e, R2-2100129, E-Conference, Jan. 25-Feb. 5, 2021, pp. 1-4.

* cited by examiner

TECHNIQUES FOR PRIORITIZING MULTIPLE SETS OF RANDOM ACCESS CHANNEL PARAMETERS

CROSS REFERENCE

The present Application for Patent is a continuation of PCT International Patent Application No. PCT/CN2021/084384 by CHENG, et al., entitled "TECHNIQUES FOR PRIORITIZING MULTIPLE SETS OF RANDOM ACCESS CHANNEL PARAMETERS", filed Mar. 31, 2021; which is assigned to the assignee hereof and which is incorporated by reference herein in its entirety.

FIELD OF TECHNOLOGY

The following relates to wireless communications, including techniques for prioritizing multiple sets of random access channel parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for prioritizing multiple sets of random access channel (RACH) parameters. Generally, the described techniques provide for a user equipment (UE) to select a set of RACH prioritization parameters from multiple sets of RACH prioritization parameters to perform a RACH procedure for a network slice. The UE may be configured with one or more sets of RACH prioritization parameters, which may be related to a priority of the RACH procedure performed by the UE. Additionally, the UE may be configured for one or more network slices of a wireless network. When the UE is triggered to perform a RACH procedure for a network slice of the one or more network slices, the UE may select one set of RACH prioritization parameters to use when performing the RACH procedure. In some cases, the UE may be configured with corresponding priorities for each set of RACH prioritization parameters, and the UE may select a set of RACH prioritization parameters from the sets of RACH prioritization parameters based on the corresponding priorities. For example, the UE may select a set of RACH prioritization parameters with a highest priority to perform the RACH procedure. Some additional techniques for configuring the sets of prioritization parameters, corresponding priorities, and selecting a set of prioritization parameters are described herein.

A method for wireless communication at a UE is described. The method may include receiving an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, selecting the first set of prioritization parameters from the set of multiple sets of prioritization parameters based on the first set of prioritization parameters being associated with the higher priority network slice and on a trigger to perform the RACH procedure for a network slice, and performing the RACH procedure for the network slice according to the first set of prioritization parameters.

An apparatus for wireless communication at a UE is described. The apparatus may include a processor, memory coupled with the processor, and instructions stored in the memory. The instructions may be executable by the processor to cause the apparatus to receive an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, select the first set of prioritization parameters from the set of multiple sets of prioritization parameters based on the first set of prioritization parameters being associated with the higher priority network slice and on a trigger to perform the RACH procedure for a network slice, and perform the RACH procedure for the network slice according to the first set of prioritization parameters.

Another apparatus for wireless communication at a UE is described. The apparatus may include means for receiving an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, means for selecting the first set of prioritization parameters from the set of multiple sets of prioritization parameters based on the first set of prioritization parameters being associated with the higher priority network slice and on a trigger to perform the RACH procedure for a network slice, and means for performing the RACH procedure for the network slice according to the first set of prioritization parameters.

A non-transitory computer-readable medium storing code for wireless communication at a UE is described. The code may include instructions executable by a processor to receive an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, select the first set of prioritization parameters from the set of multiple sets of prioritization parameters based on the first set of prioritization parameters being associated with the higher priority network slice and on a trigger to perform the RACH procedure for a network slice, and perform the RACH procedure for the network slice according to the first set of prioritization parameters.

Some examples of the method, apparatuses, and non-transitory computer-readable medium described herein may further include operations, features, means, or instructions for receiving an indication of corresponding priorities for each set of prioritization parameters of the set of multiple sets of prioritization parameters, where the first set of prioritization parameters may be selected based on receiving the indication of the corresponding priorities for each set of prioritization parameters of the set of multiple sets of prioritization parameters.

In some examples of the method, apparatuses, and non-transitory computer-readable medium described herein, receiving the indication of the corresponding priorities may include operations, features, means, or instructions for receiving the indication of the corresponding priorities for each set of prioritization parameters via system information, radio resource control (RRC) signaling, non-access stratum (NAS) signaling, or any combination thereof.

In some examples of the method, apparatuses, and non-transitory computer-readable medium described herein, receiving the indication of the configuration may include operations, features, means, or instructions for receiving the indication of the configuration via a system information (SIB) block, RRC signaling, NAS signaling, or any combination thereof.

In some examples of the method, apparatuses, and non-transitory computer-readable medium described herein, each set of prioritization parameters of the set of multiple sets of prioritization parameters may be associated with a handover procedure, a beam failure recovery procedure, multimedia priority service signaling, mission critical service signaling, one or more access identities, one or more network slides, or one or more access categories, or any combination thereof.

Some examples of the method, apparatuses, and non-transitory computer-readable medium described herein may further include operations, features, means, or instructions for receiving, via a RRC, a first indication of a first priority for the first set of prioritization parameters and receiving, via RRC signaling, a second indication of a second priority for the first set of prioritization parameters, where the RACH procedure may be performed according to the first set of prioritization parameters based on receiving the second indication of the second priority.

In some examples of the method, apparatuses, and non-transitory computer-readable medium described herein, each of the set of prioritization parameters includes a preamble ramping step, a backoff scaling factor, a listen before talk configuration, or a channel access priority, or any combination thereof.

Some examples of the method, apparatuses, and non-transitory computer-readable medium described herein may further include operations, features, means, or instructions for identifying one or more prioritization parameters of the first set of prioritization parameters based on the indication of the configuration and determining one or more cell-specific parameters for a remaining one or more prioritization parameters of the first set of prioritization parameters, where the RACH procedure may be performed based on the determining.

Some examples of the method, apparatuses, and non-transitory computer-readable medium described herein may further include operations, features, means, or instructions for receiving, from a base station, an indication of the higher priority network slice and the first set of prioritization parameters, where the first set of prioritization parameters may be selected based on receiving the indication.

Some examples of the method, apparatuses, and non-transitory computer-readable medium described herein may further include operations, features, means, or instructions for determining a priority ordering for the set of multiple sets of prioritization parameters, where the priority ordering includes multimedia priority service and mission critical service RACH procedures as a first priority, a network slice-specific and access category-specific RACH procedures as a second priority lower than the first priority, an access identity-specific RACH procedures as a third priority lower than the second priority, and a handover-specific and beam failure recovery-specific RACH procedures as a fourth priority lower than the third priority.

In some examples of the method, apparatuses, and non-transitory computer-readable medium described herein, the configuration for the set of multiple sets of prioritization parameters indicates a corresponding network slice for each set of prioritization parameters based on network slice selection assistance information, a single network slice selection assistance information, a slice or service type, a set of single network slice selection assistance information, or any combination thereof.

A method for wireless communication at a base station is described. The method may include transmitting, to a UE, an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, determining the first set of prioritization parameters from the set of multiple sets of prioritization parameters based on the first set of prioritization parameters being associated with the higher priority network slice and a trigger to perform the RACH procedure for a network slice, and performing the RACH procedure with the UE for the network slice according to the first set of prioritization parameters.

An apparatus for wireless communication at a base station is described. The apparatus may include a processor, memory coupled with the processor, and instructions stored in the memory. The instructions may be executable by the processor to cause the apparatus to transmit, to a UE, an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, determine the first set of prioritization parameters from the set of multiple sets of prioritization parameters based on the first set of prioritization parameters being associated with the higher priority network slice and a trigger to perform the RACH procedure for a network slice, and perform the RACH procedure with the UE for the network slice according to the first set of prioritization parameters.

Another apparatus for wireless communication at a base station is described. The apparatus may include means for transmitting, to a UE, an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, means for determining the first set of prioritization parameters from the set of multiple sets of prioritization parameters based on the first set of prioritization parameters being associated with the higher priority network slice and a trigger to perform the RACH procedure for a network slice, and means for performing the RACH procedure with the UE for the network slice according to the first set of prioritization parameters.

A non-transitory computer-readable medium storing code for wireless communication at a base station is described. The code may include instructions executable by a processor to transmit, to a UE, an indication of a configuration for a set of multiple sets of prioritization parameters for a RACH procedure, where a first set of prioritization parameters of the set of multiple sets of prioritization parameters is associated with a higher priority network slice than a remainder of the set of multiple sets of prioritization parameters, determine the first set of prioritization parameters from the set of multiple sets of prioritization parameters based on the first set of prioritization parameters being associated with the higher priority network slice and a trigger to perform the RACH procedure for a network slice, and perform the RACH procedure with the UE for the network slice according to the first set of prioritization parameters.

Some examples of the method, apparatuses, and non-transitory computer-readable medium described herein may further include operations, features, means, or instructions for transmitting an indication of corresponding priorities for each set of prioritization parameters of the set of multiple sets of prioritization parameters, where the first set of prioritization parameters may be determined based on the corresponding priorities for each set of prioritization parameters of the set of multiple sets of prioritization parameters.

In some examples of the method, apparatuses, and non-transitory computer-readable medium described herein, transmitting the indication of the corresponding priorities may include operations, features, means, or instructions for transmitting the indication of the corresponding priorities for each set of prioritization parameters via system information, RRC signaling, NAS signaling, or any combination thereof.

In some examples of the method, apparatuses, and non-transitory computer-readable medium described herein, transmitting the indication of the configuration may include operations, features, means, or instructions for transmitting the indication of the configuration via a RRC, RRC signaling, NAS signaling, or any combination thereof.

In some examples of the method, apparatuses, and non-transitory computer-readable medium described herein, each set of prioritization parameters of the set of multiple sets of prioritization parameters may be associated with a handover procedure, a beam failure recovery procedure, multimedia priority service signaling, mission critical service signaling, one or more access identities, one or more network slides, or one or more access categories, or any combination thereof.

Some examples of the method, apparatuses, and non-transitory computer-readable medium described herein may further include operations, features, means, or instructions for transmitting, via a SIB, a first indication of a first priority for the first set of prioritization parameters and transmitting, via RRC signaling, a second indication of a second priority for the first set of prioritization parameters, where the second indication overwrites the first indication.

In some examples of the method, apparatuses, and non-transitory computer-readable medium described herein, each of the set of prioritization parameters includes a preamble ramping step, a backoff scaling factor, a listen before talk configuration, or a channel access priority, or any combination thereof.

Some examples of the method, apparatuses, and non-transitory computer-readable medium described herein may further include operations, features, means, or instructions for identifying one or more prioritization parameters of the first set of prioritization parameters based on the indication of the configuration and determining one or more cell-specific parameters for a remaining one or more prioritization parameters of the first set of prioritization parameters, where the RACH procedure may be performed based on the determining.

Some examples of the method, apparatuses, and non-transitory computer-readable medium described herein may further include operations, features, means, or instructions for transmitting, to the UE, an indication of the first set of prioritization parameters from the set of multiple sets of prioritization parameters, where the first set of prioritization parameters may be selected based on receiving the indication.

Some examples of the method, apparatuses, and non-transitory computer-readable medium described herein may further include operations, features, means, or instructions for determining a priority ordering for the set of multiple sets of prioritization parameters, where the priority ordering includes multimedia priority service and mission critical service RACH procedures as a highest priority, then network slice-specific and access category-specific RACH procedures, then access identity-specific RACH procedures, then handover-specific and beam failure recovery-specific RACH procedures.

In some examples of the method, apparatuses, and non-transitory computer-readable medium described herein, the configuration for the set of multiple sets of prioritization parameters indicates a corresponding network slice for each set of prioritization parameters based on network slice selection assistance information, a single network slice selection assistance information, a slice or service type, a set of single network slice selection assistance information, or any combination thereof.

Some examples of the method, apparatuses, and non-transitory computer-readable medium described herein may further include operations, features, means, or instructions for receiving, from a network entity, an indication of one or more network slice identifiers, one or more network slice group identifiers, one or more access category identifiers, one or more access category group identifiers, or one or more random access prioritization parameter set identifiers, or any combination thereof, where the first set of prioritization parameters may be determined based on receiving the indication from the network entity.

DETAILED DESCRIPTION

Figure 1:
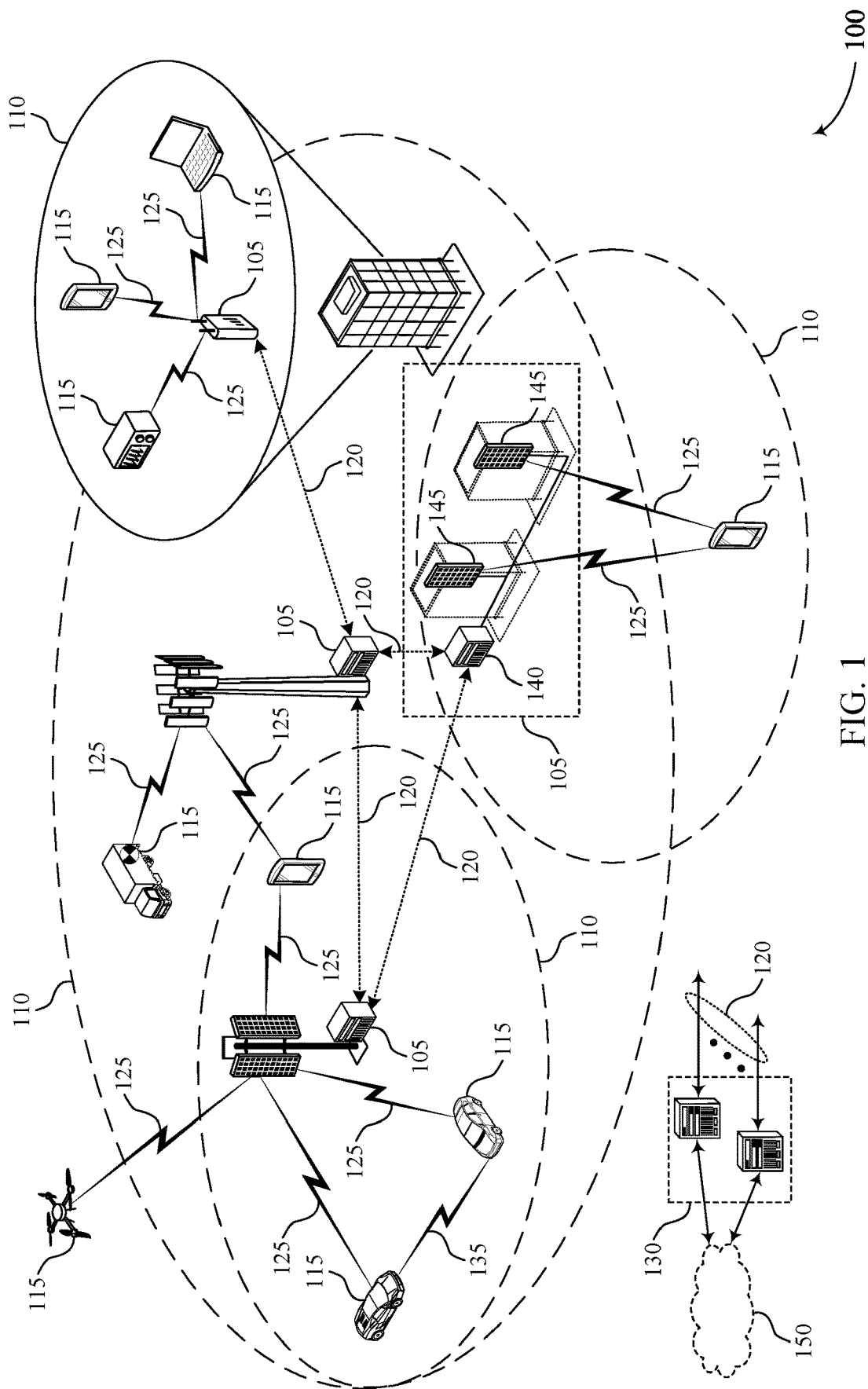
FIG. 1 illustrates an example of a wireless communications system that supports techniques for prioritizing multiple sets of random access channel (RACH) parameters in accordance with aspects of the present disclosure.

A user equipment (UE) in a wireless communications system may perform a random access channel (RACH) procedure to establish a connection, such as a Radio Resource Control (RRC) connection, with a base station. A UE may perform a RACH procedure under different circumstances, such as performing a RACH procedure for initial access or performing a RACH procedure for a handover or beam failure recovery. The UE may be configured with one or more sets of RACH prioritization parameters, which may be related to a priority of a RACH procedure performed by the UE. For example, some sets of RACH prioritization parameters may configure the UE to more aggressively perform a RACH procedure to quickly establish an RRC connection for higher priority signaling. A set of RACH prioritization parameters may include, for example, a preamble ramping step or a backoff scaling factor, with values set to increase the priority of a RACH procedure performed by the UE.

Some wireless communications systems may implement network slicing to provide multiple virtual networks using common network infrastructure. Network slices may be associated with different services, priorities, access categories, access identities, security requirements, or other characteristics (or any combination thereof), to provide separate virtual networks with different uses for the network slices. Some wireless communications systems that implement network slicing may use cell-specific RACH resources and configurations for RACH procedures. These techniques of other different wireless communications systems may not provide techniques for network slice-aware RACH procedures. Therefore, a UE in these other different systems may use a same RACH configuration for each network slice. As such, higher priority network slices may perform RACH procedures using a same configuration as other, lower priority network slices, which may delay RACH procedures for urgent or higher priority network slices in some instances.

The present disclosure provides techniques for utilizing multiple sets of RACH prioritization parameters, such as in the context of a wireless communications system implementing network slicing. For example, a UE may be configured with multiple sets of RACH prioritization parameters for different access categories, procedures, slices, access identities, or any combination thereof. The UE may also be configured with multiple network slices. For example, the UE may be configured with a first network slice for some services, such as mission critical or priority multimedia services, and the UE may receive signaling configuring a second, more urgent network slice. The present disclosure provides techniques for the UE to select a set of RACH prioritization parameters from multiple configured sets of RACH prioritization parameters to perform a RACH procedure for the second network slice. For example, each set of RACH prioritization parameters may have a respective associated priority. The priorities may be configured (e.g., signaled to the UE by another device such as a base station) or preconfigured at the UE (e.g., and then referenced by the UE based on some indication or other trigger). When the UE is triggered to perform a RACH procedure for the second, more urgent network slice, the UE may select a set of RACH prioritization parameters with a given priority, such as a highest priority, to perform the RACH procedure and establish an RRC connection for the second network slice.

Aspects of the disclosure are initially described in the context of wireless communications systems. Aspects of the disclosure are further illustrated by and described in the context of a process flow. Aspects of the disclosure are further illustrated by and described with reference to apparatus diagrams, system diagrams, and flowcharts that relate to techniques for prioritizing multiple sets of RACH parameters.

FIG. 1 illustrates an example of a wireless communications system 100 that supports techniques for prioritizing multiple sets of RACH parameters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 in a wireless communications system may perform a RACH procedure to establish, or re-establish, an RRC connection with a cell or a base station 105. In some cases, the UE 115 may perform a four-step RACH procedure or a two-step RACH procedure, or the UE 115 may be configured to perform both two-step and four-step RACH procedures. For a RACH procedure, a UE 115 may transmit a random access preamble (e.g., a first RACH message or RACH Message 1) to a beam provided by a base station 105. The base station 105 may transmit a random access response (e.g., a second RACH message or RACH Message 2) to the UE 115 in response to the RACH preamble. The random access response may be transmitted to the UE 115 on downlink shared channel resources and may include an uplink grant scheduling the UE 115 for a third random access message (e.g., RACH Message 3). The third random access message transmitted by the UE 115 may be based on a scenario in which the UE 115 is performing the RACH procedure. For example, the third random access message may include initial RRC connection information for initial access, RRC connection reestablishment information, or handover information, among other information for different scenarios. The base station 105 may receive the third random access message and transmit a fourth random access message in response. The fourth random access message (e.g., RACH Message 4) may be a contention resolution message, which may complete the RACH procedure.

A UE 115 may perform a RACH procedure under different circumstances. For example, the UE 115 may perform a RACH procedure for initial access to establish an RRC connection, a handover to another base station 105, or for beam failure recovery, among other examples.

In some cases, a UE 115 may be configured with one or more sets of RACH prioritization parameters, which may be related to a priority the UE has when performing a RACH procedure. For example, some sets of RACH prioritization parameters may enable the UE 115 to more aggressively perform a RACH procedure to recover a failed beam or be handed over to a higher quality cell. For example, a preamble ramping step and a backoff scaling factor may be used, or set, for prioritized RACH access when the UE 115 performs a RACH procedure for a handover or beam failure recovery. These techniques may be implemented for different types of RACH procedures (e.g., two-step RACH and four-step RACH) or RACH procedures triggered by different events or signaling. For example, the UE 115 may use a set of RACH prioritization parameters that increase the priority of a RACH procedure which is triggered by mission critical service (MCS) communications or multimedia priority service (MPS) communications.

In some cases, a UE 115 may be configured to communicate according to one or more access categories. For example, different access categories may correspond to different conditions related to the UE 115 and a different type of access attempt. For example, Access Category 1 may correspond to when a UE 115 is configured for delay tolerant services and subject to access control for Access Category 1, which may be based on a relation of the UE's public land mobile network (PLMN) or home PLMN (HPMLN). For Access Category 1, the UE 115 may perform any type of access attempt except for emergency access attempts. Other access categories may similarly be associated with an access category number, an associated condition related to the UE 115, and a type of access attempt that may be used for the access category.

The wireless communications system 100 may implement network slicing to provide multiple virtual networks using common network infrastructure. Network slices may be associated with different services, priorities, access categories, access identities, security requirements, or other characteristics, to provide separate virtual networks with different uses for the network slices.

Network slices may be negotiated by a NAS registration procedure. A base station 105 may send a setup request (e.g., a Next Generation (NG) setup request) to an AMF of the core network 130. The setup request may include network slice selection assistance information (NSSAI) (e.g., a single NSSAI (S-NSSAI)) list per tracking area identifier (TAI). The AMF may send an NG setup response to the base station 105 in response. In some examples, NAS signaling may correspond to signaling or information exchange between the UE 115 and the core network nodes (e.g., an core network entity), and access stratum (AS) signaling may correspond to signaling or information exchange between the UE 115 and the radio network (e.g., a network providing LTE or NR services).

A UE 115 may send an RRC message, such as an RRC Message 5, to the base station 105 105. The information in the RRC Message 5 may be used for AMF selection and may be a subset of NAS requested-NSSAI based on a security of the RRC Message 5. In some cases, the RRC message may include, for example, a request NSSAI (e.g., AS-Requested-NSSAI) or a NAS registration request (e.g., Request-NSSAI), or both. The base station 105 may send, to the AMF, an initial UE message including a NAS registration request. The AMF may send an initial UE context setup request to the base station 105, including an allowed NSSAI, NAS registration accept information, or both. For example, the AMF may indicate allowed NSSAIs or rejected NSSAIs for the UE 115. The allowed NSSAI may include a minimal common set of a requested NSSAI, or a default S-NSSAIs if no valid S-NSSAIs are requested, a subscribed NSSAI, and a current TAI supported NSSAI. The UE 115 and the base station 105 may exchange a security mode command, and the base station 105 may send an RRC reconfiguration to the UE 115 indicating the NAS registration acceptance.

After the NAS registration procedure, the UE 115, the base station 105, and the AMF may each have a UE context for the UE 115. The UE context at the UE 115 may include configured NSSAI, requested NSSAI, allowed NSSAI, rejected NSSAI, or any combination thereof. The UE context at the base station 105 may include allowed NSSAI, NSSAI of active protocol data unit (PDU) sessions, or both. The UE context at the AMF may include subscribed NSSAI, requested NSSAI, allowed NSSAI, rejected NSSAI, or any combination thereof. In some cases, a PDU session establishment may be associated with a slice in the allowed NSSAI. In some cases, network slice support may be uniform in a tracking area.

Some wireless communications systems that implement network slicing may use cell-specific RACH resources and configurations for RACH procedures. These techniques of other different wireless communications systems may not provide techniques for network slice-aware RACH procedure. Therefore, a UE 115 in these systems may use a same RACH configuration for each network slice regardless of a priority of each network slice. As such, the UE 115 may perform a RACH procedure for a higher priority network slice using a same configuration and RACH parameters as other, lower priority network slices, which may delay success of the RACH procedure for the urgent network slice.

The wireless communications system 100, as well as other wireless communications systems described herein, may implement techniques to support multiple sets of RACH prioritization parameters. For example, the wireless communications system 100 may support configuring a UE 115 while supporting network slicing. Slice-specific RACH parameters may be prioritized and configured per network slice or per network slice group. The UE 115 may be configured with network slice priority (e.g., a priority for a network slice) via RRC signaling, system information (e.g., via a system information block (SIB)), NAS signaling, or any combination thereof. Through RRC signaling or a SIB, some network slices may be configured with isolated RACH resources or prioritized RACH parameters. In some cases, the prioritized RACH parameters may be different from cell-specific RACH parameters. When traffic arrives at the UE 115 to trigger a RACH procedure, the NAS of the UE 115 may indicate a network slice identity to the access stratum (AS) of the UE 115. The AS of the UE 115 may select corresponding RACH resources and parameters for RACH access.

Figure 2:
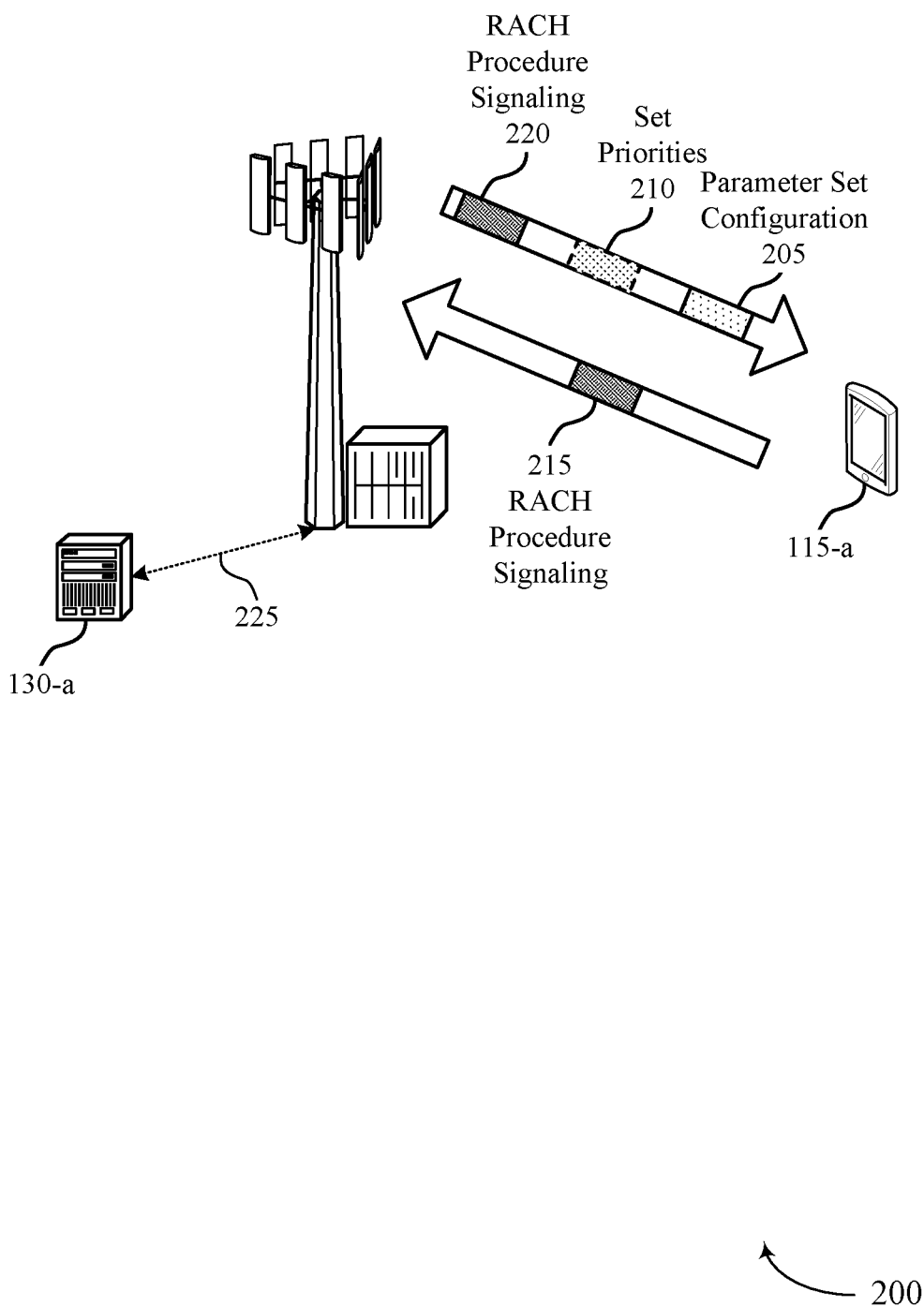
FIG. 2 illustrates an example of a wireless communications system that supports techniques for prioritizing multiple sets of RACH parameters in accordance with aspects of the present disclosure.

FIG. 2 illustrates an example of a wireless communications system 200 that supports techniques for prioritizing multiple sets of RACH parameters in accordance with aspects of the present disclosure. The wireless communications system 200 may be an example of, or implement aspects of, the wireless communications system 100. The wireless communications system 200 may include a UE 115-a and a base station 105-a, which may be respective examples of a UE 115 and a base station 105 as described with reference to FIG. 1. The wireless communications system 200 may include a network entity 130-a, which may include aspects of an entity for a core network 130 or an AMF as described with reference to FIG. 1.

The wireless communications system 200 may support network slicing. For example, the UE 115-a may be configured with one or more network slices. A network slice may be associated with one or more access categories, access identities, services, security configurations, or any combination thereof. In some cases, the UE 115-a may be configured with multiple network slices, which may each provide a virtual network using common infrastructure within the wireless communications system 200. In some cases, network slices may be configured at the UE 115-a using a NAS registration procedure, such as the procedure described with reference to FIG. 1. In some cases, the base station 105-b may receive, from the network entity 130-a over a link 225, a configuration for one or more network slices, a configuration for one or more sets of RACH prioritization parameters, or one or more priorities corresponding to the one or more sets of RACH prioritization parameters, or some combination thereof.

The UE 115-a may be configured with multiple sets of RACH prioritization parameters for performing RACH procedures. For example, the base station 105-a may transmit an indication of a parameter set configuration 205 to the UE 115-a, and the parameter set configuration 205 may relate to the RACH prioritization parameters. In some cases, the RACH prioritization parameter sets may be configured via RRC signaling, a SIB, or both. Each different set of RACH prioritization parameters may be associated with a configuration, a scenario, a type of service, or any combination thereof. For example, a set of RACH prioritization parameters may be associated with a handover or beam failure recovery procedure, MPS or MCS communications, one or more access identities, one or more network slices, one or more access categories, or any combination thereof. Configuring the UE 115-a with multiple sets of RACH prioritization parameters may provide flexibility for performing RACH procedures. For example, the UE 115-a may be configured with two sets of RACH prioritization parameters, where a first set may be associated with MPS and MCS, and a second set may be associated with an urgent network slice. In some cases, each set of RACH prioritization parameters may have, or be configured with, a different corresponding RACH prioritization parameter set identifier.

The UE 115-a may implement techniques to select a set of RACH prioritization parameters from the multiple configured sets of RACH prioritization parameters to perform a RACH procedure. For example, when the UE 115-a is configured to perform a RACH procedure for an arriving network slice, the UE 115-a may select one of the sets of RACH prioritization parameters to perform the RACH procedure.

In some cases, the UE 115-a may select a set of RACH prioritization parameters with a highest priority to perform the RACH procedure. For example, each set of RACH prioritization parameters may have or correspond to a different associated priority. When the UE 115-a is triggered to perform a RACH procedure, the UE 115-a may select a set of RACH prioritization parameters with a highest priority to perform the RACH procedure. This may provide an increased likelihood of successfully completing the RACH procedure or a reduced latency for a successful RACH procedure.

In some examples, the UE 115-a may be configured with multiple sets of RACH prioritization parameters and a corresponding priority for each set of RACH prioritization parameters. For example, in some cases, the UE 115-a may receive a priority configuration 210 indicating priorities for one or more sets of RACH prioritization parameters. Different sets of RACH prioritization parameters may have different priorities. For example, a first set of RACH prioritization parameters may have a higher priority than a second set of RACH prioritization parameters. In some cases, the priorities may correspond to an urgency or an importance for completing a RACH procedure associated with set of RACH prioritization parameters. For example, a first set of RACH prioritization parameters associated with MCS and MPS may be configured with a higher priority (e.g., a higher priority value) than a second set of RACH prioritization parameters associated with a lower-urgency network slice. In some cases, a priority indicated by RRC signaling for a set of parameters may take precedence (e.g., override, overwrite) compared to a priority indicated by a SIB for the set of parameters. For example, the UE 115-a may receive a SIB indicating a first priority for a first set of RACH prioritization parameters, and the UE 115-a may (e.g., afterward) receive RRC signaling indicating a second priority for the first set of RACH prioritization parameters. The UE 115-a may associate the second priority with the first set of RACH prioritization parameters instead of the first priority.

The priority of each configured set may be configured by signaling (e.g., from another device) or may be preconfigured at the UE 115-a. For example, the priority of each configured set of RACH prioritization parameters may be configured by a SIB, RRC signaling, NAS signaling, other examples, or any combination thereof. In some examples, the signaling may include an indication of one or more sets of RACH prioritization parameters. This indication may, in some cases, include one or more sets of RACH prioritization parameters. Additionally, or alternatively, this indication may, in some cases, include an indication that the UE 115-a may use to reference one or more sets of RACH prioritization parameters previously configured or stored at the UE. Additionally, or alternatively, the UE 115-a may be configured (e.g., preconfigured) with priorities for different sets of RACH prioritization parameters. In some cases, the UE 115-a may be configured with priorities for sets associated with certain procedures, access categories, configurations, access identities, or any combination thereof. Therefore, if the UE 115-a is configured with a set of RACH prioritization parameters associated with a procedure, access category, configuration, network slice, service, access identity, or any combination thereof, the UE 115-a may determine a priority for the set of RACH prioritization parameters (e.g., without additional signaling). In some cases, a priority indicated by RRC signaling or NAS signaling for a set may overwrite a priority which is preconfigured or configured by a SIB for the set. In some cases, if the UE 115-a is not configured with a priority for a set of RACH prioritization parameters, the UE 115-a may use a preconfigured priority for the set.

Each set of RACH prioritization parameters may include one or more parameters that adjust how the UE 115-a performs a RACH procedure. For example, a set of RACH prioritization parameters may include a preamble ramping step, a backoff scaling factor, a listen-before-talk (LBT) configuration (or other clear channel assessment configuration), a channel access priority, or any combination thereof. In some cases, the LBT configuration may indicate an LBT format, timers, or other configurations or parameters for an LBT procedure. In some cases, each set of RACH prioritization parameters may have a certain set of parameters. If one parameter from the set is not signaled or indicated to the UE 115-a through configuration signaling, the UE 115-a may use a corresponding cell-specific parameter. For example, the UE 115-a is not indicated a channel access priority for a first set of RACH prioritization parameters, the UE 115-a may use a cell-specific channel access priority for the first set of RACH prioritization parameters.

The UE 115-a may be triggered to perform a RACH procedure and select a set of RACH prioritization parameters. When the RACH procedure is triggered, a NAS of the UE 115-a may indicate a set of information to an AS of the UE 115-a. For example, the NAS may indicate one or more slice identifiers, one or more slice group identifiers, one or more access category identifiers, one or more access category group identifiers, one or more access identity identifiers, one or more access identity group identifiers, one or more RACH prioritization parameter set identifiers, or any combination thereof.

The UE 115-a may, in some examples, select a set of RACH prioritization parameters with a highest priority to perform the RACH procedure. For example, the AS of the UE 115-a may select the set of RACH prioritization parameters with the highest priority to perform the RACH procedure. In some cases, the UE 115-a may select the set with the highest priority of the configured sets of RACH prioritization parameters. In some other examples, the UE 115-a may select a set of RACH prioritization parameters with a highest priority from a group of sets indicated to the UE 115-a when the RACH procedure is triggered. For example, the base station 105-a may indicate a group of sets of prioritization parameters to the UE 115-a when a RACH is triggered, and the UE 115-a may select a set of prioritization parameters with the highest priority from the group. Alternatively, the UE 115-a may, in some examples, select a set of RACH prioritization parameters with a priority other than (e.g., lower than) a highest priority to perform the RACH procedure.

In some cases, if the priorities are not configured via signaling, the UE 115-*a* may select a set of RACH prioritization parameters based on a configured or preconfigured priority ordering. As described above, sets of RACH prioritization parameters may have preconfigured priorities. The UE 115-*a* may determine an ordering for the priorities of configured sets of RACH prioritization parameters. In some examples, sets of RACH prioritization parameters associated with MPS or MCS may have a highest priority. In some examples, sets of RACH prioritization parameters associated with a network slice or a network slice group may have a second highest priority. In some examples, sets of RACH prioritization parameters associated with an access identity or an access identity group (e.g., except for MPS and MCS) may have a third highest priority. In some examples, sets of RACH prioritization parameters associated with a handover or beam failure recovery may have a fourth highest priority. As described, the priority for a set of RACH prioritization parameters may be configured to have a different priority and therefore may have a higher or lower priority than the ordering. Additionally, or alternatively, different priority orderings may be configured or preconfigured at the UE 115-*a*.

The UE 115-*a* may perform the RACH procedure in accordance with the selected set of RACH prioritization parameters. For example, the UE 115-*a* may send RACH procedure signaling 215 to the base station 105-*a* and receive RACH procedure signaling 220 from the base station 105-*a*. The UE 115-*a* may perform the RACH procedure according to, for example, a preamble ramping step, a backoff scaling factor, an LBT procedure, a channel access priority, or any combination thereof, included in the selected set of RACH prioritization parameters. This may provide the UE 115-*a* to perform the RACH procedure with a higher priority, increasing a likelihood of a successful RACH procedure. The UE 115-*a* may complete the RACH procedure and establish or re-establish an RRC connection based on the completion.

Using techniques described herein, the wireless communications system 200 may provide techniques to support slice-based RACH configurations, mechanics, and signaling. The wireless communications system 200 may support techniques to configure RACH parameters prioritization (e.g., scalingFactorBI and powerRampingStepHighPriority) for a slice or slice group. Additionally, the wireless communications system 200 may support techniques to implement slice-based RACH configurations, mechanics, and signaling while supporting previous functionality, such as how to perform a RACH type selection (e.g., for selecting 2-step RACH or 4-set RACH) supporting RACH fall-back cases, and handling simultaneous configuration with similar techniques such as some random access prioritization (e.g., for MPS and MCS UEs).

In some cases, RACH prioritization may be applied for certain types of RACH procedures. In some cases, RACH prioritization may be applied to contention-based random access procedures. In some cases, RACH prioritization may or may not be applied to contention-free random access procedures.

The wireless communications system 200 may support slice-separated physical RACH (PRACH) configuration-specific RACH parameters prioritization, which may be referred to as RACH prioritization. For example, a UE 115 or base station 105, or both, may support slice-based RACH configuration, specify mechanisms and signaling including, for mobile originating cases, configuring RACH parameters prioritization (e.g., scalingFactorBI and powerRampingStepHighPriority) for a slice or slice group.

Some RACH parameters may be separately configured for a slice or slice group. In some cases, a scaling factor (e.g., scalingFactorBI) and a power ramping step (e.g., powerRampingStepHighPriority) can be configured with different values for prioritized RACH access in a handover or beam failure recovery. In some cases, these two parameters can be separately configured for MCS and MPS-triggered RACH. Therefore, slice specific RACH prioritization may use these two parameters and, in some additional, or alternative, cases, other parameters as well.

For example, a scaling factor and power ramping step may be included in each slice specific prioritized RACH parameters. In some cases, some other parameters can may also be included as slice-specific prioritized RACH parameters.

The wireless communications system 200 may support techniques to implement techniques of the present disclosure as well as existing techniques for random access procedures and prioritization. For example, the wireless communications system 200 may support slice-specific RACH prioritization and random access prioritization for MPS/MCS, such as how to handle simultaneous configuration with more than one set of RA prioritization parameters. For example, an MPS/MCS UE 115 may be configured with two sets of prioritization parameters, where one set is for MPS/MCS, and the other set is for urgent slice arriving. These techniques may be implemented alongside RACH type selection (e.g., between 2-step and 4-step), support of RACH fall-back cases, handling of simultaneous configuration with similar functions such as random access prioritization (e.g., for MPS and MCS UEs).

To support these techniques, the wireless communications system 200, and devices of the wireless communications system 200, may use one or more fixed prioritization rules. For example, RACH prioritization for MPS/MCS may overrule, or have a higher priority, than RACH prioritization for slice/slice group. Additionally, or alternatively, the wireless communications system 200, and devices of the wireless communications system 200, may implement a flexible or configurable technique or set of rules. For example, a priority value can be configured for each random access prioritization parameters set (e.g. a set of random access prioritization parameters for MPS/MCS may have a first priority and a set of random access prioritization parameters for a URLLC slice may have a second priority), and the UE's AS may select the set of RACH prioritization parameters with the highest priority to perform a RACH procedure. This priority value can also be pre-configured via the UE's subscription.

In some cases, for each random access prioritization parameters set, such as for one set for MPS/MCS and a second set for a URLLC slice, a priority value can be configured by gNB or pre-configured via UE's subscription. In some cases, the UE's AS may select the set of RACH prioritization parameters with highest priority to perform a RACH procedure.

Figure 3:
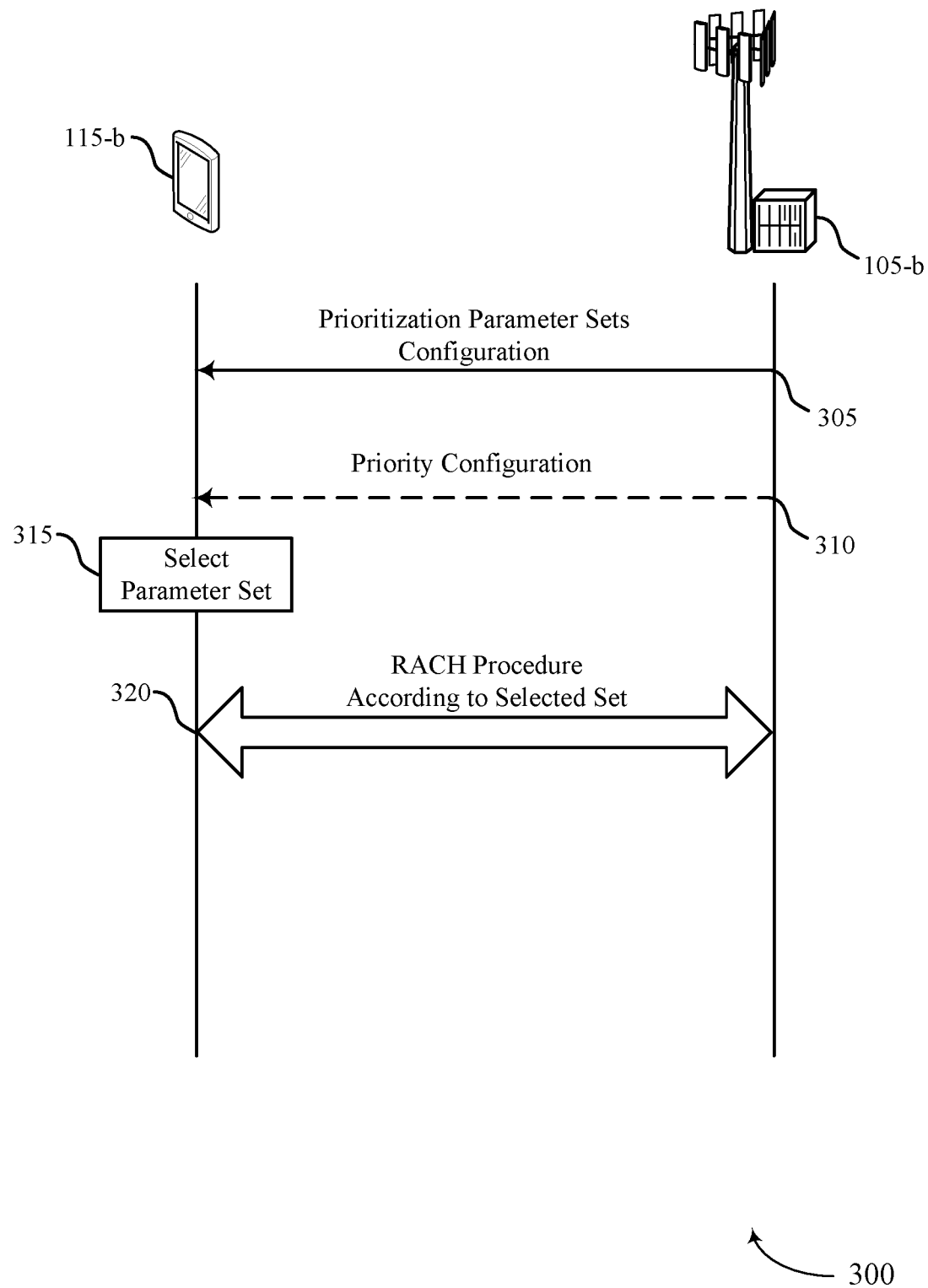
FIG. 3 illustrates an example of a process flow that supports techniques for prioritizing multiple sets of RACH parameters in accordance with aspects of the present disclosure.

FIG. 3 illustrates an example of a process flow 300 that supports techniques for prioritizing multiple sets of RACH parameters in accordance with aspects of the present disclosure. The process flow 300 may be implemented by a UE 115-*b*, or a base station 105-*b*, or both, which may be respective examples of a UE 115 and a base station 105 as described with reference to FIGS. 1 and 2. In some cases, some operations or signaling of the process flow 300 may occur in a different order than shown by FIG. 3. Additionally, some operations or signaling may be additionally performed, or some shown operations or signaling may not be performed and may be omitted.

At 305, the UE 115-*b* may receive, from the base station 105-*b*, an indication of a configuration for multiple sets of prioritization parameters for a RACH procedure. In some cases, a first set of prioritization parameters of the multiple sets of prioritization parameters may be associated with a higher priority network slice than at least some others of the multiple sets of prioritization parameters (or in some examples a remainder of the multiple sets of prioritization parameters). In some cases, a set of RACH prioritization parameters may be an example of a set of prioritization parameters. In some cases, the UE 115-*b* may receive the indication of the configuration for the multiple sets of prioritization parameters via a SIB, RRC signaling, NAS signaling, or any combination thereof. In some cases, each set of prioritization parameters may be associated with a handover procedure, a beam failure recovery procedure, MPS signaling, MCS signaling, one or more access identities, one or more network slices, or one or more access categories, or any combination thereof.

Each set of prioritization parameters may include one or more parameters for performing a RACH procedure. For example, the first set of prioritization parameters may include a preamble ramping step, a backoff scaling factor, a listen before talk configuration, or a channel access priority. These parameters may correspond to how aggressively the UE 115-*b* performs a RACH procedure. For example, using prioritization parameters associated with a higher priority RACH procedure may increase a likelihood that the UE 115-*b* performs a successful RACH procedure. For example, the UE 115-*b* may perform an LBT procedure associated with higher priority signaling, which may increase likelihood of the UE 115-*b* performing a successful LBT procedure and quickly establishing an RRC connection.

In some cases, at 310, the UE 115-*b* may receive, from the base station 105-*b*, an indication of corresponding priorities for each set of prioritization parameters of the multiple sets of prioritization parameters. In some cases, the indication of the corresponding priorities may be received via system information (e.g., a SIB), RRC signaling, NAS signaling, or any combination thereof.

The UE 115-*b* may be triggered to perform a RACH procedure. For example, the UE 115-*b* may be configured for an arrival of a network slice. At 315, the UE 115-*b* may select the first set of prioritization parameters from the multiple sets of prioritization parameters based on the first set of prioritization parameters being associated with the higher priority network slice and the trigger to perform the RACH procedure for the network slice. For example, when the UE 115-*b* is triggered to perform a RACH procedure for a network slice, the UE 115-*b* may select a set of prioritization parameters with a highest priority to perform the RACH procedure.

In some alternative cases the UE 115-*b* may receive, from the base station 105-*b*, an indication of corresponding priorities for each set of prioritization parameters of the multiple sets of prioritization parameters during a same receiving operation as the indication of a configuration for multiple sets of prioritization parameters for a RACH procedure (e.g., at 305).

At 320, the UE 115-*b* and the base station 105-*b* may perform the RACH procedure for the network slice according to the first set of prioritization parameters. For example, the UE 115-*b* may perform an LBT procedure for the RACH procedure according to one or more parameters in the first set of prioritization parameters, which may result in a higher likelihood of success in performing the RACH procedure. Upon successfully performing the RACH procedure, the UE 115-*b* may establish or re-establish an RRC connection for the network slice.

Figure 4:
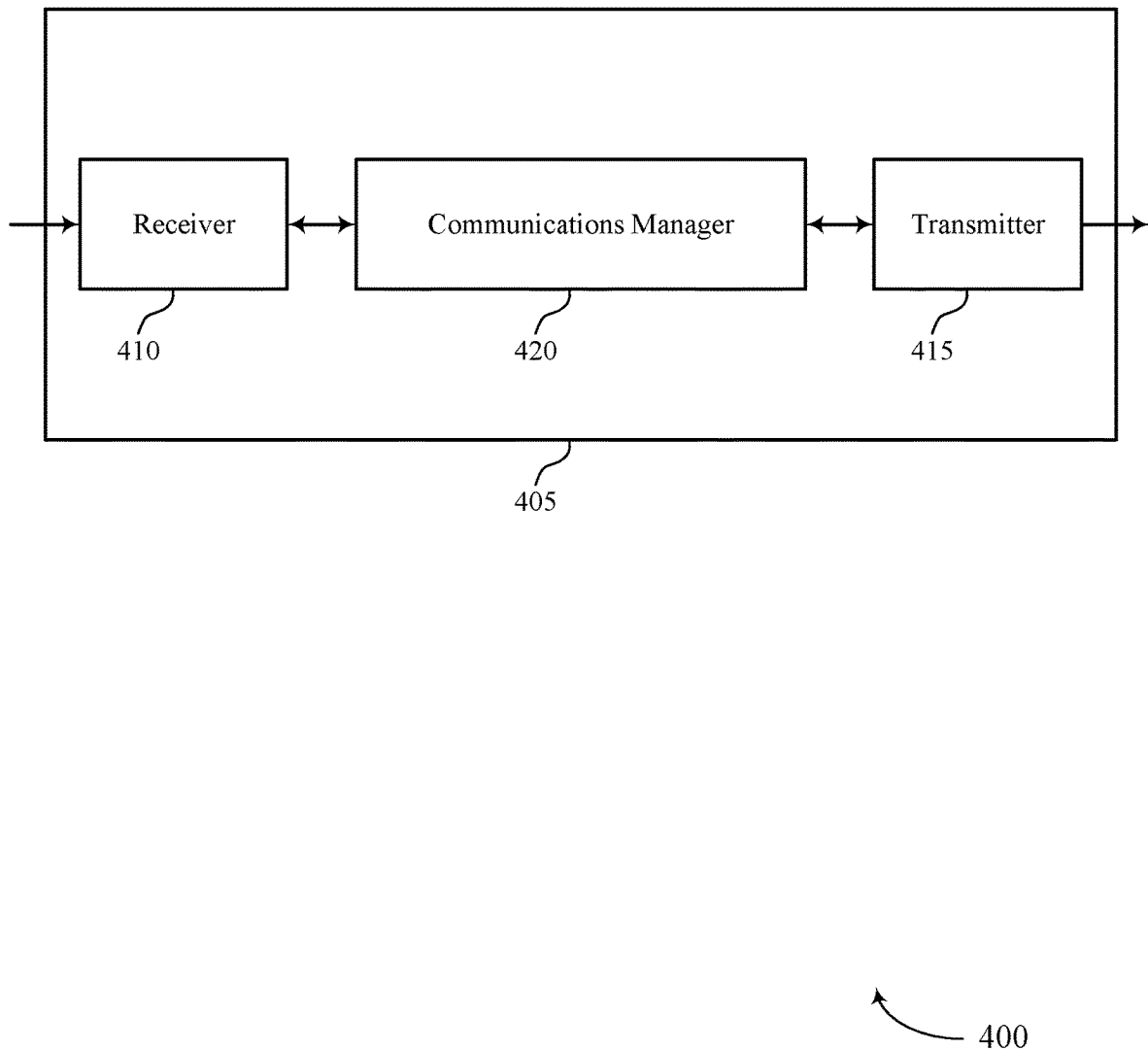
FIGS. 4 and 5 show block diagrams of devices that support techniques for prioritizing multiple sets of RACH parameters in accordance with aspects of the present disclosure.

FIG. 4 shows a block diagram 400 of a device 405 that supports techniques for prioritizing multiple sets of random access channel parameters in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for prioritizing multiple sets of random access channel parameters). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for prioritizing multiple sets of random access channel parameters). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for prioritizing multiple sets of random access channel parameters as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The communications manager 420 may be configured as or otherwise support a means for selecting the first set of prioritization parameters from the multiple sets of prioritization parameters based on the first set of prioritization parameters being associated with the higher priority network slice and on a trigger to perform the random access channel procedure for a network slice. The communications manager 420 may be configured as or otherwise support a means for performing the random access channel procedure for the network slice according to the first set of prioritization parameters.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for performing a RACH procedure using higher priority RACH parameters. For example, the device 405 may perform the RACH procedure using a high priority set of RACH prioritization parameters, increasing a likelihood of successfully performing the RACH procedure and establishing or re-establishing an RRC connection. This may reduce latency for signaling at the device 405.

Figure 5:
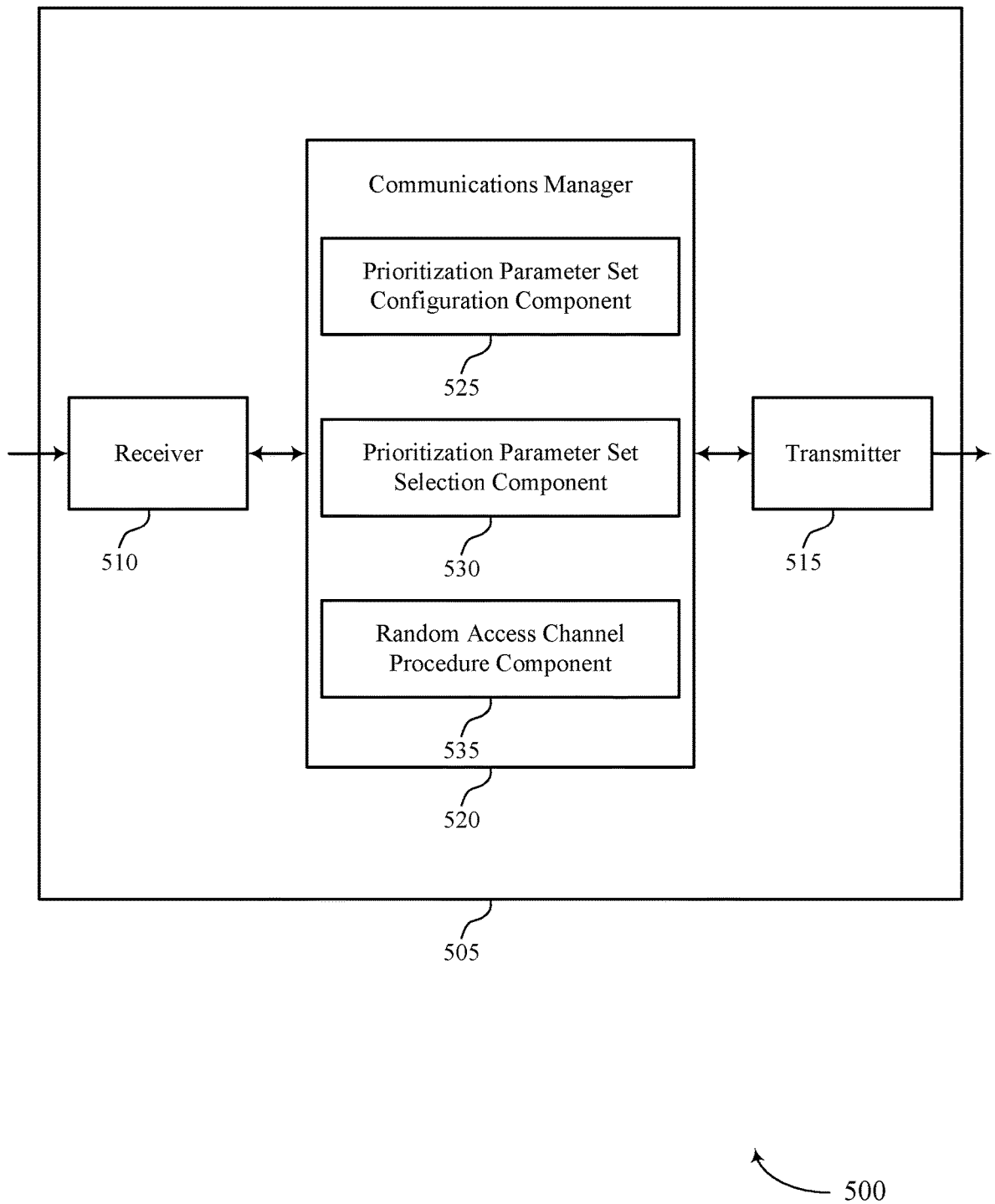

FIG. 5 shows a block diagram 500 of a device 505 that supports techniques for prioritizing multiple sets of random access channel parameters in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for prioritizing multiple sets of random access channel parameters). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for prioritizing multiple sets of random access channel parameters). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for prioritizing multiple sets of random access channel parameters as described herein. For example, the communications manager 520 may include a prioritization parameter set configuration component 525, a prioritization parameter set selection component 530, a random access channel procedure component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The prioritization parameter set configuration component 525 may be configured as or otherwise support a means for receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The prioritization parameter set selection component 530 may be configured as or otherwise support a means for selecting the first set of prioritization parameters from the multiple sets of prioritization parameters based on the first set of prioritization parameters being associated with the higher priority network slice and on a trigger to perform the random access channel procedure for a network slice. The random access channel procedure component 535 may be configured as or otherwise support a means for performing the random access channel procedure for the network slice according to the first set of prioritization parameters.

Figure 6:
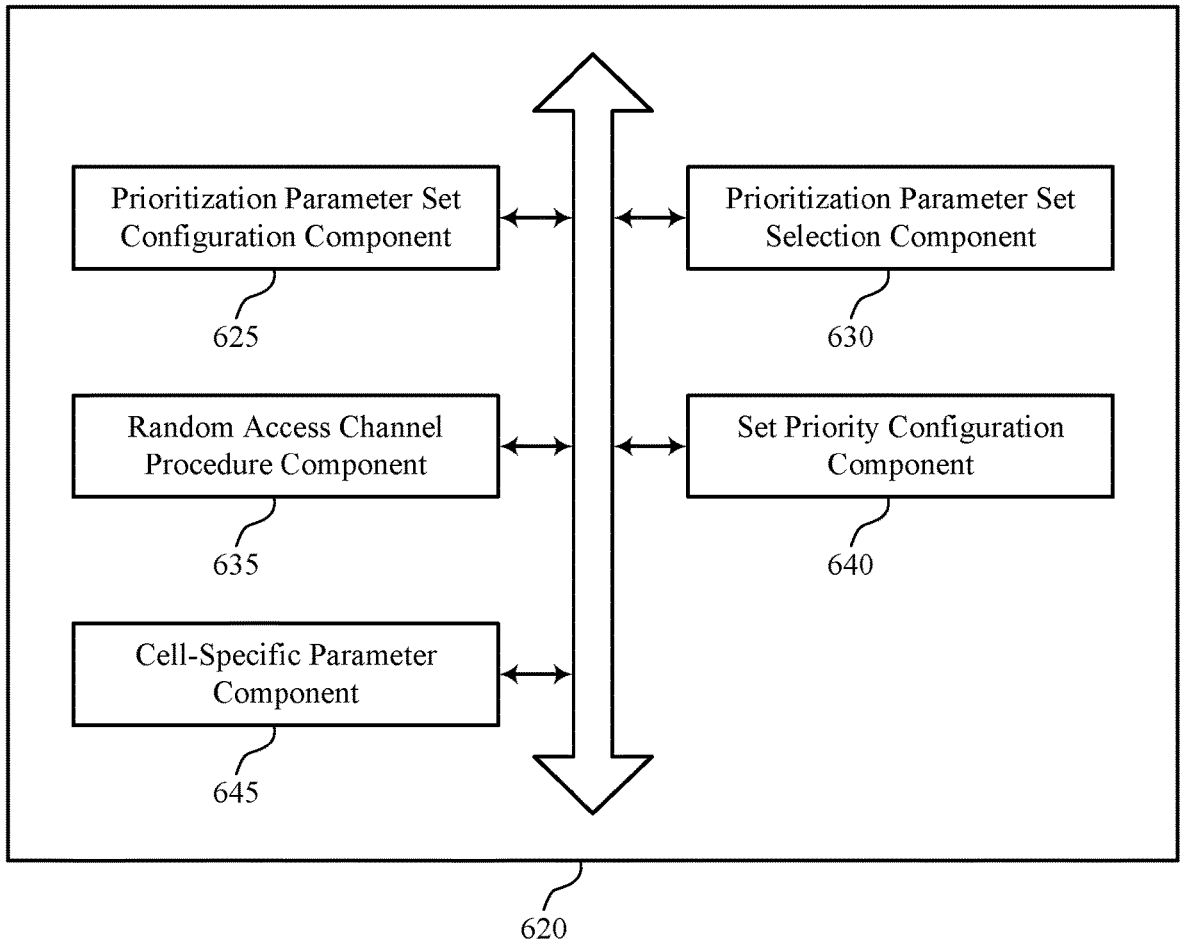
FIG. 6 shows a block diagram of a communications manager that supports techniques for prioritizing multiple sets of RACH parameters in accordance with aspects of the present disclosure.

FIG. 6 shows a block diagram 600 of a communications manager 620 that supports techniques for prioritizing multiple sets of random access channel parameters in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for prioritizing multiple sets of random access channel parameters as described herein. For example, the communications manager 620 may include a prioritization parameter set configuration component 625, a prioritization parameter set selection component 630, a random access channel procedure component 635, a set priority configuration component 640, a cell-specific parameter component 645, or any combination thereof. Each of these components may communicate, directly or indirectly, with one another (e.g., via one or more buses).

The communications manager 620 may support wireless communication at a UE in accordance with examples as disclosed herein. The prioritization parameter set configuration component 625 may be configured as or otherwise support a means for receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The prioritization parameter set selection component 630 may be configured as or otherwise support a means for selecting the first set of prioritization parameters from the multiple sets of prioritization parameters based on the first set of prioritization parameters being associated with the higher priority network slice and on a trigger to perform the random access channel procedure for a network slice. The random access channel procedure component 635 may be configured as or otherwise support a means for performing the random access channel procedure for the network slice according to the first set of prioritization parameters.

In some examples, the set priority configuration component 640 may be configured as or otherwise support a means for receiving an indication of corresponding priorities for each set of prioritization parameters of the multiple sets of prioritization parameters, where the first set of prioritization parameters is selected based on receiving the indication of the corresponding priorities for each set of prioritization parameters of the multiple sets of prioritization parameters.

In some examples, to support receiving the indication of the corresponding priorities, the set priority configuration component 640 may be configured as or otherwise support a means for receiving the indication of the corresponding priorities for each set of prioritization parameters via system information, radio resource control signaling, NAS signaling, or any combination thereof.

In some examples, to support receiving the indication of the configuration, the prioritization parameter set configuration component 625 may be configured as or otherwise support a means for receiving the indication of the configuration via a system information block, radio resource control signaling, NAS signaling, or any combination thereof.

In some examples, each set of prioritization parameters of the multiple sets of prioritization parameters is associated with a handover procedure, a beam failure recovery procedure, multimedia priority service signaling, mission critical service signaling, one or more access identities, one or more network slices, or one or more access categories, or any combination thereof.

In some examples, the prioritization parameter set selection component 630 may be configured as or otherwise support a means for receiving, via a system information block, a first indication of a first priority for the first set of prioritization parameters. In some examples, the prioritization parameter set selection component 630 may be configured as or otherwise support a means for receiving, via radio resource control signaling, a second indication of a second priority for the first set of prioritization parameters, where the random access channel procedure is performed according to the first set of prioritization parameters based on receiving the second indication of the second priority.

In some examples, each of the set of prioritization parameters includes a preamble ramping step, a backoff scaling factor, a listen before talk configuration, or a channel access priority, or any combination thereof.

In some examples, the cell-specific parameter component 645 may be configured as or otherwise support a means for identifying one or more prioritization parameters of the first set of prioritization parameters based on the indication of the configuration. In some examples, the cell-specific parameter component 645 may be configured as or otherwise support a means for determining one or more cell-specific parameters for a remaining one or more prioritization parameters of the first set of prioritization parameters, where the random access channel procedure is performed based on the determining.

In some examples, the prioritization parameter set selection component 630 may be configured as or otherwise support a means for receiving, from a base station, an indication of the higher priority network slice and the first set of prioritization parameters, where the first set of prioritization parameters is selected based on receiving the indication.

In some examples, the set priority configuration component 640 may be configured as or otherwise support a means for determining a priority ordering for the multiple sets of prioritization parameters, where the priority ordering includes multimedia priority service and mission critical service random access channel procedures as a first priority, a network slice-specific and access category-specific random access channel procedures as a second priority lower than the first priority, an access identity-specific random access channel procedures as a third priority lower than the second priority, and a handover-specific and beam failure recovery-specific random access channel procedures as a fourth priority lower than the third priority.

In some examples, the configuration for the multiple sets of prioritization parameters indicates a corresponding network slice for each set of prioritization parameters based on network slice selection assistance information, a single network slice selection assistance information, a slice or service type, a set of single network slice selection assistance information, or any combination thereof.

Figure 7:
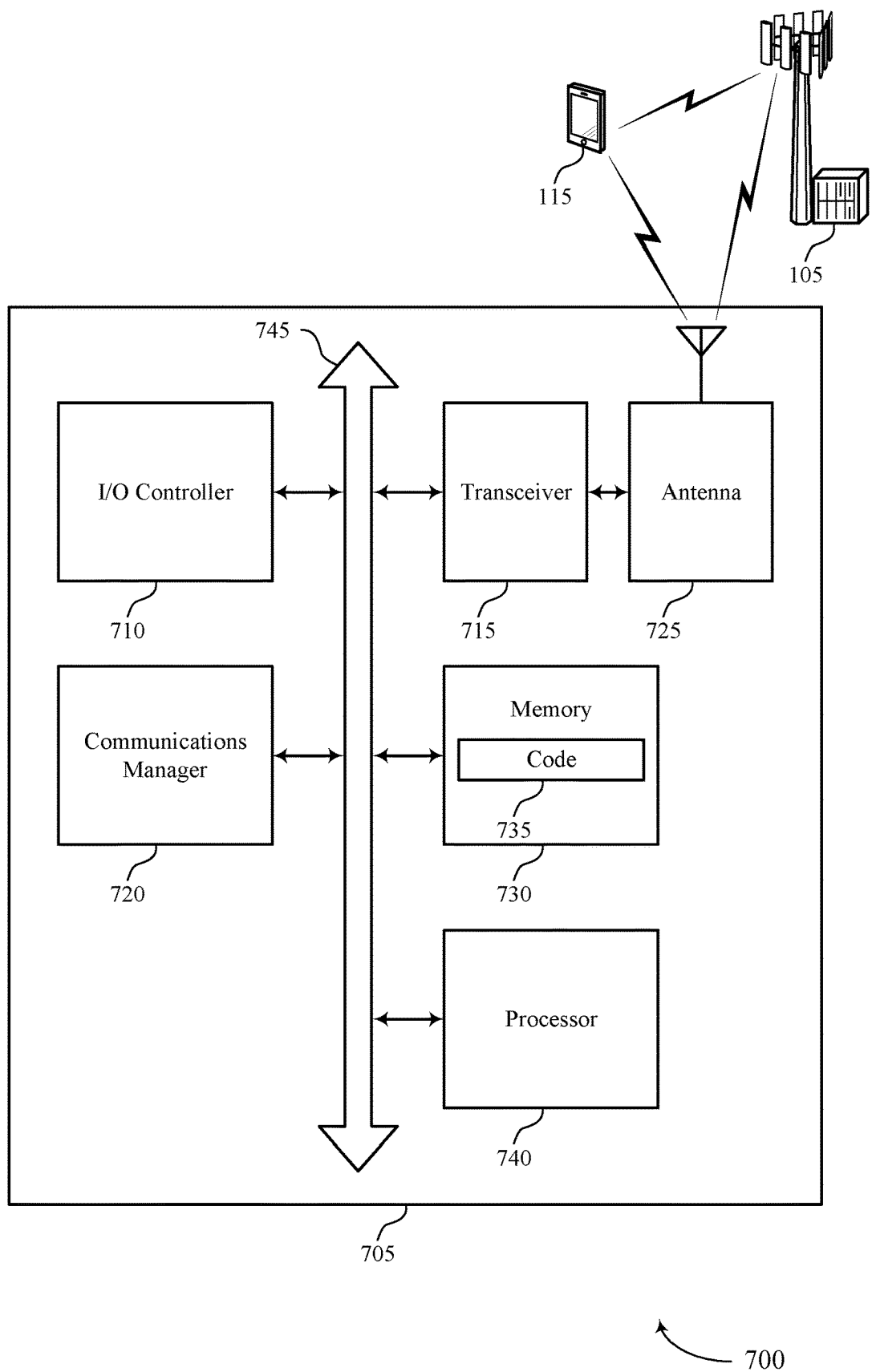
FIG. 7 shows a diagram of a system including a device that supports techniques for prioritizing multiple sets of RACH parameters in accordance with aspects of the present disclosure.

FIG. 7 shows a diagram of a system 700 including a device 705 that supports techniques for prioritizing multiple sets of random access channel parameters in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for prioritizing multiple sets of random access channel parameters). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The communications manager 720 may be configured as or otherwise support a means for selecting the first set of prioritization parameters from the multiple sets of prioritization parameters based on the first set of prioritization parameters being associated with the higher priority network slice and on a trigger to perform the random access channel procedure for a network slice. The communications manager 720 may be configured as or otherwise support a means for performing the random access channel procedure for the network slice according to the first set of prioritization parameters.

By including or configuring the communications manager 720 in accordance with examples as described herein, the device 705 may support techniques for performing a RACH procedure using higher priority RACH parameters. For example, the device 405 may perform the RACH procedure using a high priority set of RACH prioritization parameters, increasing a likelihood of successfully performing the RACH procedure and establishing or re-establishing an RRC connection. In some cases, the device 705 may establish the RRC connection to send high priority or urgent information (e.g., on an urgent network slice), which may be critical for other wireless devices in the network to receive.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for prioritizing multiple sets of random access channel parameters as described herein, or the processor 740 and the memory 730 may be otherwise configured to perform or support such operations.

Figure 8:
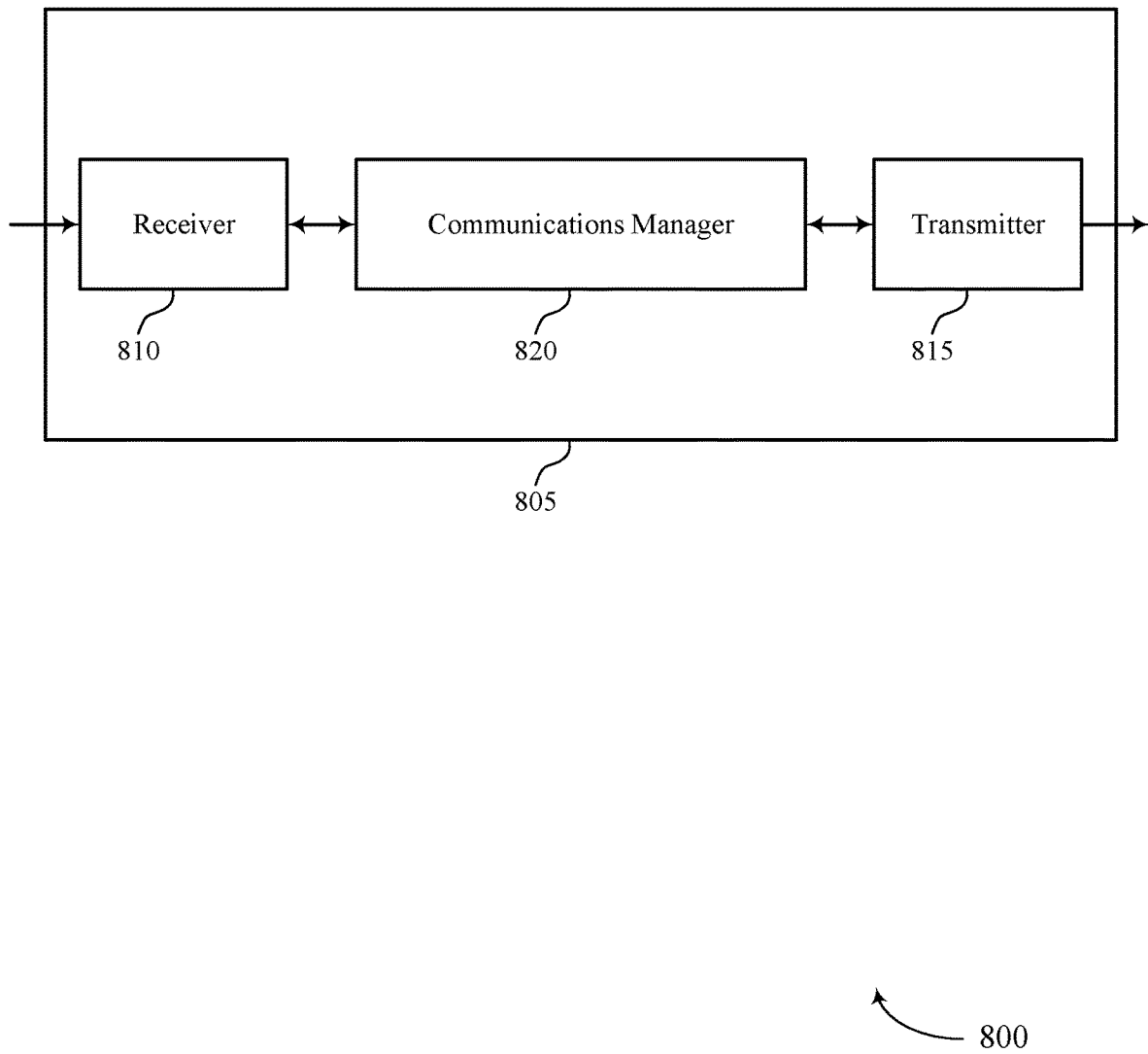
FIGS. 8 and 9 show block diagrams of devices that support techniques for prioritizing multiple sets of RACH parameters in accordance with aspects of the present disclosure.

FIG. 8 shows a block diagram 800 of a device 805 that supports techniques for prioritizing multiple sets of random access channel parameters in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for prioritizing multiple sets of random access channel parameters). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for prioritizing multiple sets of random access channel parameters). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for prioritizing multiple sets of random access channel parameters as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The communications manager 820 may be configured as or otherwise support a means for determining the first set of prioritization parameters from the multiple sets of prioritization parameters based on the first set of prioritization parameters being associated with the higher priority network slice and a trigger to perform the random access channel procedure for a network slice. The communications manager 820 may be configured as or otherwise support a means for performing the random access channel procedure with the UE for the network slice according to the first set of prioritization parameters.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for establishing an RRC connection with a UE 115 for a network slice by performing a RACH procedure with the UE 115 (e.g., sending and receiving RACH signaling) according to higher priority RACH parameters. For example, the device 705 may perform the RACH procedure using a high priority set of RACH prioritization parameters, increasing a likelihood of the UE 115 successfully performing the RACH procedure and establishing or re-establishing an RRC connection. This may reduce latency for signaling on the network slice.

Figure 9:
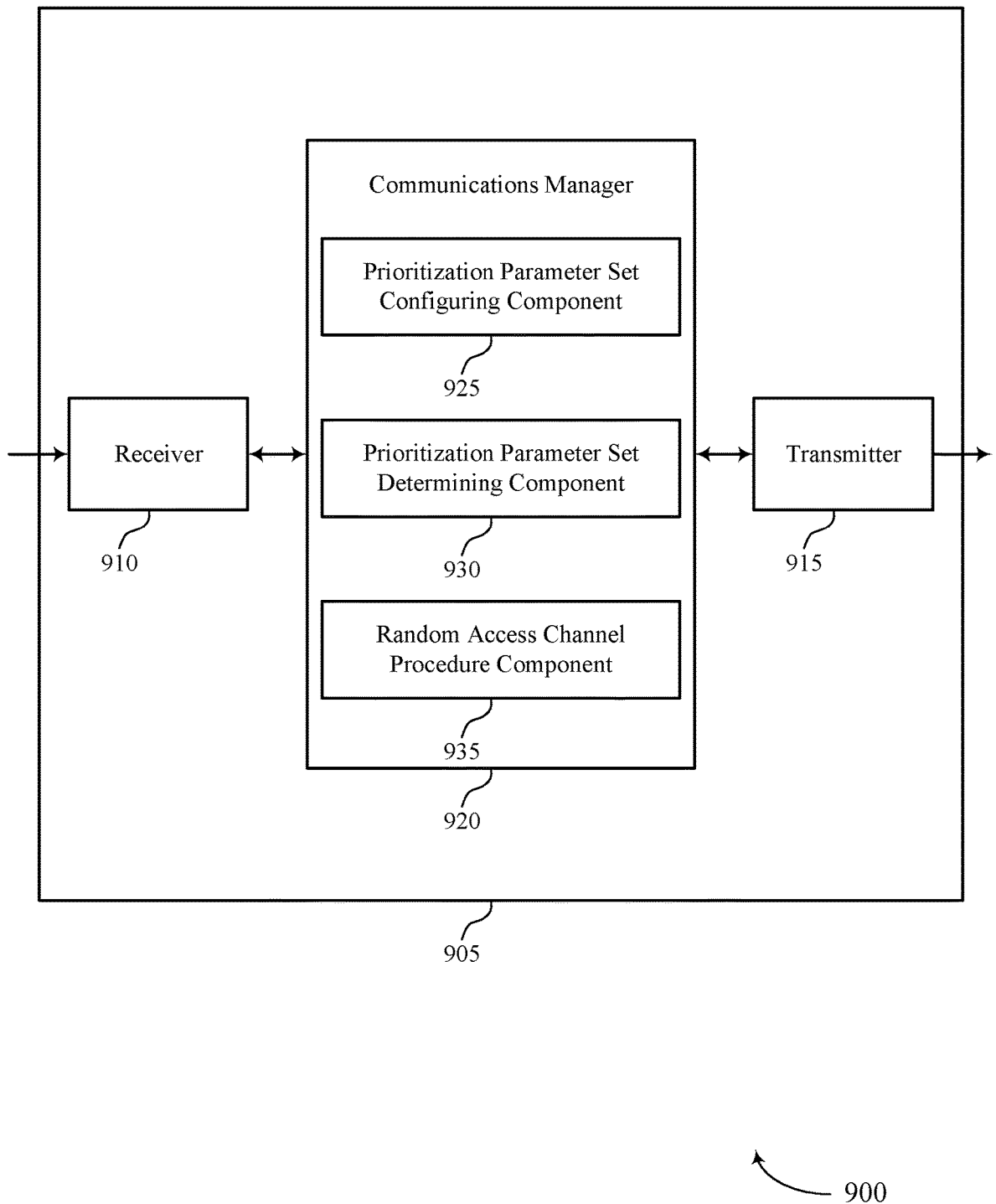

FIG. 9 shows a block diagram 900 of a device 905 that supports techniques for prioritizing multiple sets of random access channel parameters in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for prioritizing multiple sets of random access channel parameters). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for prioritizing multiple sets of random access channel parameters). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for prioritizing multiple sets of random access channel parameters as described herein. For example, the communications manager 920 may include a prioritization parameter set configuring component 925, a prioritization parameter set determining component 930, a random access channel procedure component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The prioritization parameter set configuring component 925 may be configured as or otherwise support a means for transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The prioritization parameter set determining component 930 may be configured as or otherwise support a means for determining the first set of prioritization parameters from the multiple sets of prioritization parameters based on the first set of prioritization parameters being associated with the higher priority network slice and a trigger to perform the random access channel procedure for a network slice. The random access channel procedure component 935 may be configured as or otherwise support a means for performing the random access channel procedure with the UE for the network slice according to the first set of prioritization parameters.

Figure 10:
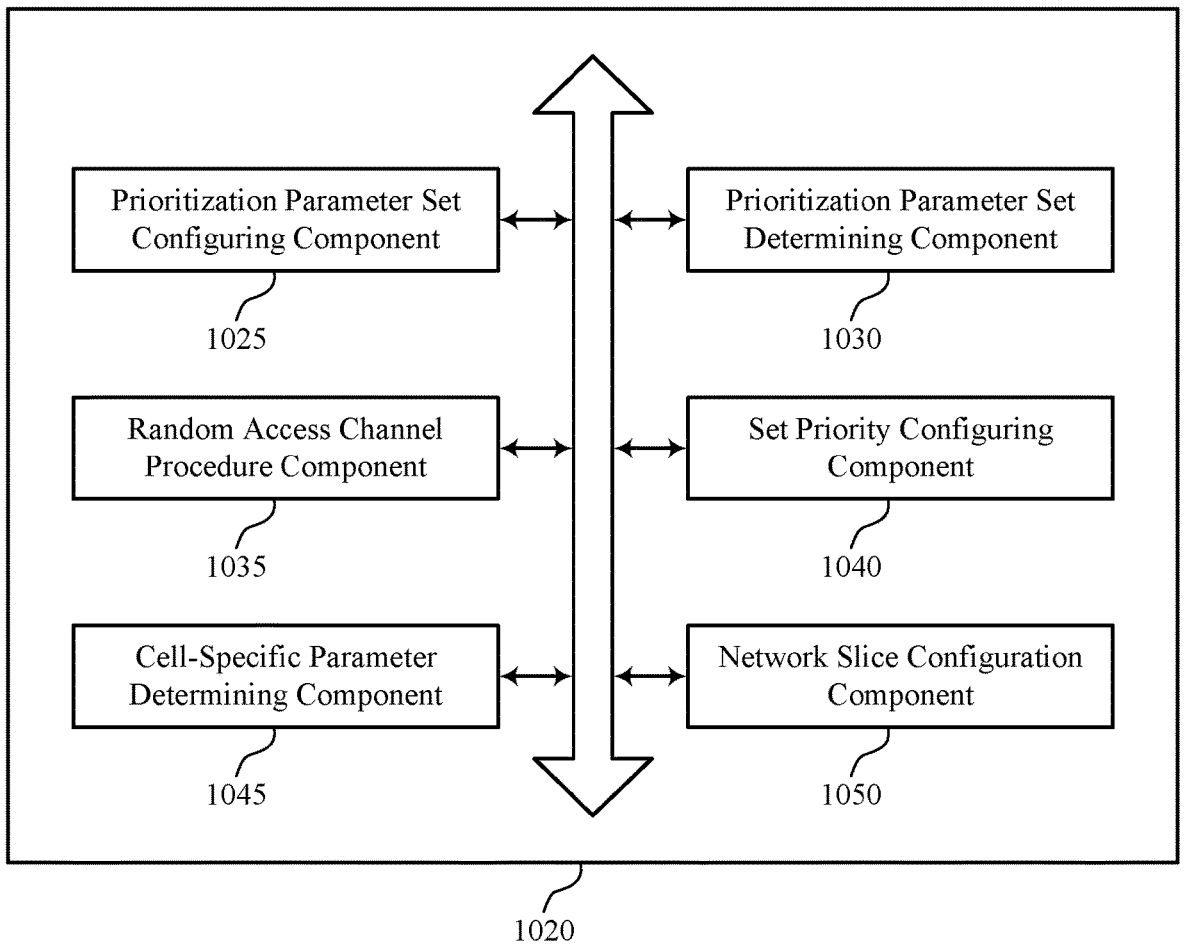
FIG. 10 shows a block diagram of a communications manager that supports techniques for prioritizing multiple sets of RACH parameters in accordance with aspects of the present disclosure.

FIG. 10 shows a block diagram 1000 of a communications manager 1020 that supports techniques for prioritizing multiple sets of random access channel parameters in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for prioritizing multiple sets of random access channel parameters as described herein. For example, the communications manager 1020 may include a prioritization parameter set configuring component 1025, a prioritization parameter set determining component 1030, a random access channel procedure component 1035, a set priority configuring component 1040, a cell-specific parameter determining component 1045, a network slice configuration component 1050, or any combination thereof. Each of these components may communicate, directly or indirectly, with one another (e.g., via one or more buses).

The communications manager 1020 may support wireless communication at a base station in accordance with examples as disclosed herein. The prioritization parameter set configuring component 1025 may be configured as or otherwise support a means for transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The prioritization parameter set determining component 1030 may be configured as or otherwise support a means for determining the first set of prioritization parameters from the multiple sets of prioritization parameters based on the first set of prioritization parameters being associated with the higher priority network slice and a trigger to perform the random access channel procedure for a network slice. The random access channel procedure component 1035 may be configured as or otherwise support a means for performing the random access channel procedure with the UE for the network slice according to the first set of prioritization parameters.

In some examples, the set priority configuring component 1040 may be configured as or otherwise support a means for transmitting an indication of corresponding priorities for each set of prioritization parameters of the multiple sets of prioritization parameters, where the first set of prioritization parameters is determined based on the corresponding priorities for each set of prioritization parameters of the multiple sets of prioritization parameters.

In some examples, to support transmitting the indication of the corresponding priorities, the set priority configuring component 1040 may be configured as or otherwise support a means for transmitting the indication of the corresponding priorities for each set of prioritization parameters via system information, radio resource control signaling, NAS signaling, or any combination thereof.

In some examples, to support transmitting the indication of the configuration, the prioritization parameter set configuring component 1025 may be configured as or otherwise support a means for transmitting the indication of the configuration via a system information block, radio resource control signaling, NAS signaling, or any combination thereof.

In some examples, each set of prioritization parameters of the multiple sets of prioritization parameters is associated with a handover procedure, a beam failure recovery procedure, multimedia priority service signaling, mission critical service signaling, one or more access identities, one or more network slices, or one or more access categories, or any combination thereof.

In some examples, the prioritization parameter set determining component 1030 may be configured as or otherwise support a means for transmitting, via a system information block, a first indication of a first priority for the first set of prioritization parameters. In some examples, the prioritization parameter set determining component 1030 may be configured as or otherwise support a means for transmitting, via radio resource control signaling, a second indication of a second priority for the first set of prioritization parameters, where the second indication overwrites the first indication.

In some examples, each of the set of prioritization parameters includes a preamble ramping step, a backoff scaling factor, a listen before talk configuration, or a channel access priority, or any combination thereof.

In some examples, the cell-specific parameter determining component 1045 may be configured as or otherwise support a means for identifying one or more prioritization parameters of the first set of prioritization parameters based on the indication of the configuration. In some examples, the cell-specific parameter determining component 1045 may be configured as or otherwise support a means for determining one or more cell-specific parameters for a remaining one or more prioritization parameters of the first set of prioritization parameters, where the random access channel procedure is performed based on the determining.

In some examples, the prioritization parameter set determining component 1030 may be configured as or otherwise support a means for transmitting, to the UE, an indication of the first set of prioritization parameters from the multiple sets of prioritization parameters, where the first set of prioritization parameters is selected based on receiving the indication.

In some examples, the set priority configuring component 1040 may be configured as or otherwise support a means for determining a priority ordering for the multiple sets of prioritization parameters, where the priority ordering includes multimedia priority service and mission critical service random access channel procedures as a highest priority, then network slice-specific and access category-specific random access channel procedures, then access identity-specific random access channel procedures, then handover-specific and beam failure recovery-specific random access channel procedures.

In some examples, the configuration for the multiple sets of prioritization parameters indicates a corresponding network slice for each set of prioritization parameters based on network slice selection assistance information, a single network slice selection assistance information, a slice or service type, a set of single network slice selection assistance information, or any combination thereof.

In some examples, the network slice configuration component 1050 may be configured as or otherwise support a means for receiving, from a network entity, an indication of one or more network slice identifiers, one or more network slice group identifiers, one or more access category identifiers, one or more access category group identifiers, or one or more random access prioritization parameter set identifiers, or any combination thereof, where the first set of prioritization parameters is determined based on receiving the indication from the network entity.

Figure 11:
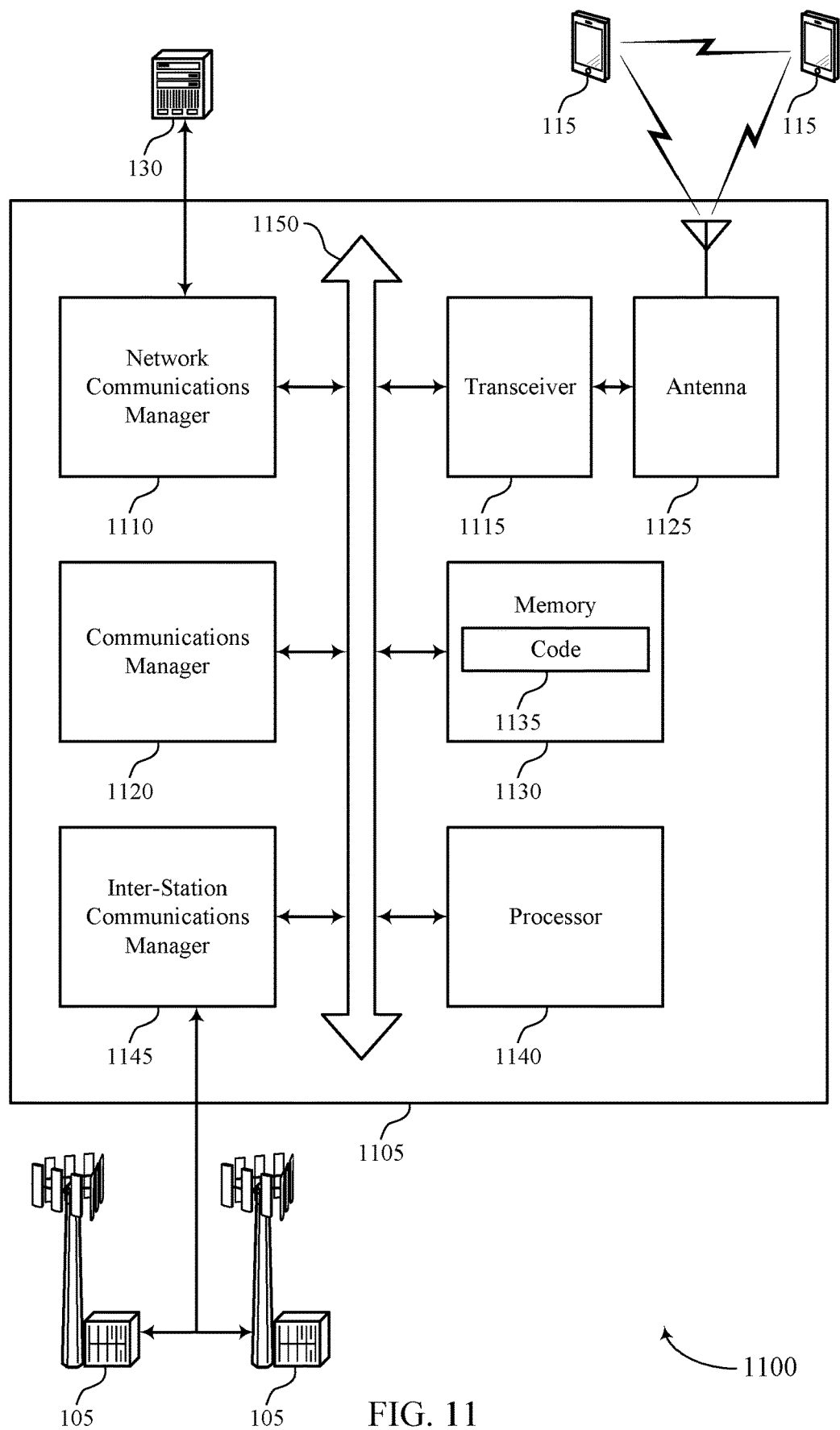
FIG. 11 shows a diagram of a system including a device that supports techniques for prioritizing multiple sets of RACH parameters in accordance with aspects of the present disclosure.

FIG. 11 shows a diagram of a system 1100 including a device 1105 that supports techniques for prioritizing multiple sets of random access channel parameters in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for prioritizing multiple sets of random access channel parameters). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The communications manager 1120 may be configured as or otherwise support a means for determining the first set of prioritization parameters from the multiple sets of prioritization parameters based on the first set of prioritization parameters being associated with the higher priority network slice and a trigger to perform the random access channel procedure for a network slice. The communications manager 1120 may be configured as or otherwise support a means for performing the random access channel procedure with the UE for the network slice according to the first set of prioritization parameters.

By including or configuring the communications manager 1120 in accordance with examples as described herein, the device 1105 may support techniques for establishing an RRC connection with a UE 115 for a network slice by performing a RACH procedure with the UE 115 (e.g., sending and receiving RACH signaling) according to higher priority RACH parameters. This may enable the UE 115 to send high priority information, such as MCS or MPS, which may be critical for other wireless devices in the wireless network to receive.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for prioritizing multiple sets of random access channel parameters as described herein, or the processor 1140 and the memory 1130 may be otherwise configured to perform or support such operations.

Figure 12:
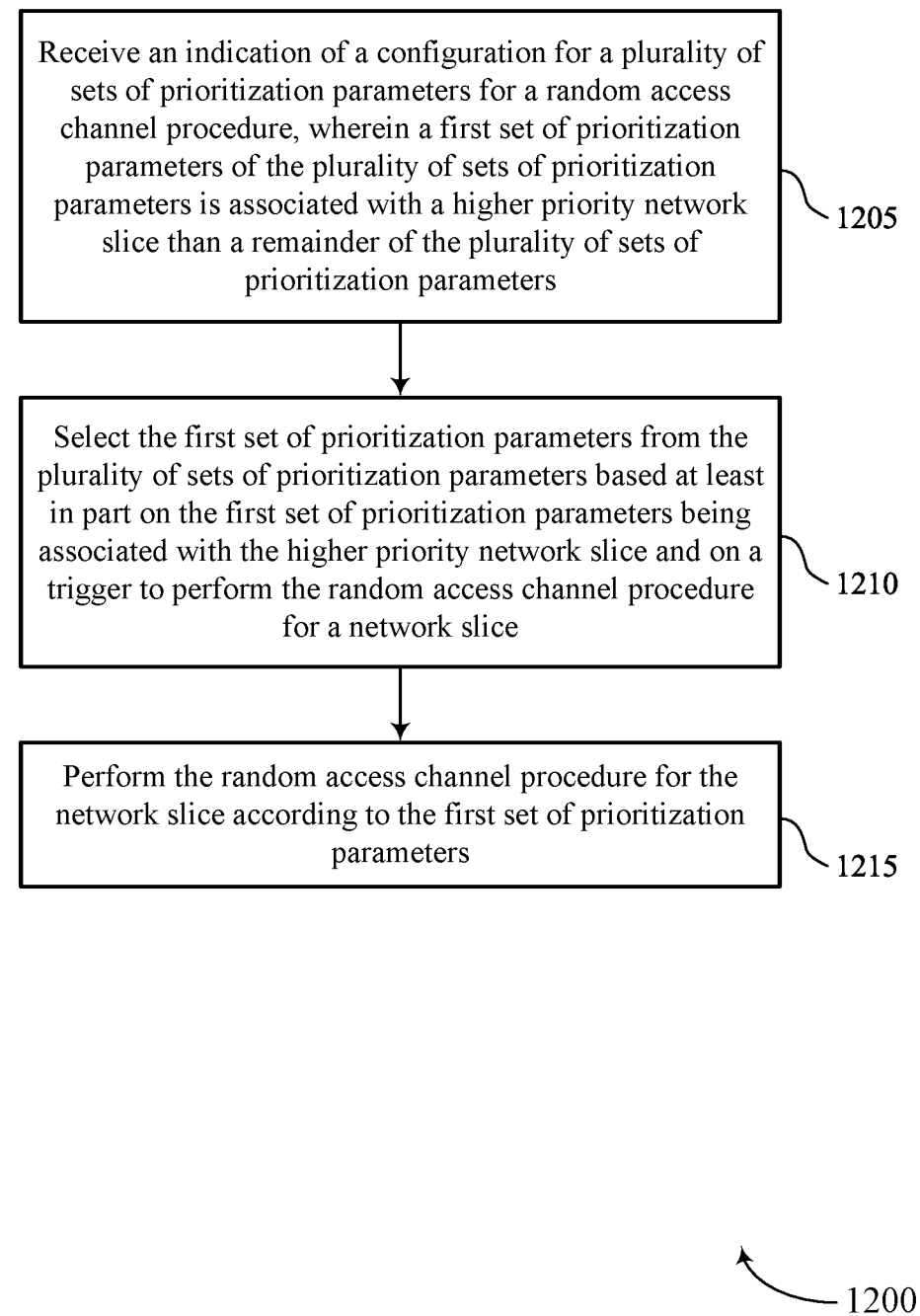
FIGS. 12 through 15 show flowcharts illustrating methods that support techniques for prioritizing multiple sets of RACH parameters in accordance with aspects of the present disclosure.

FIG. 12 shows a flowchart illustrating a method 1200 that supports techniques for prioritizing multiple sets of random access channel parameters in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The operations of 1205 may be performed in accordance with examples as disclosed herein. In some examples, aspects of the operations of 1205 may be performed by a prioritization parameter set configuration component 625 as described with reference to FIG. 6.

At 1210, the method may include selecting the first set of prioritization parameters from the multiple sets of prioritization parameters based on the first set of prioritization parameters being associated with the higher priority network slice and on a trigger to perform the random access channel procedure for a network slice. The operations of 1210 may be performed in accordance with examples as disclosed herein. In some examples, aspects of the operations of 1210 may be performed by a prioritization parameter set selection component 630 as described with reference to FIG. 6.

At 1215, the method may include performing the random access channel procedure for the network slice according to the first set of prioritization parameters. The operations of 1215 may be performed in accordance with examples as disclosed herein. In some examples, aspects of the operations of 1215 may be performed by a random access channel procedure component 635 as described with reference to FIG. 6.

Figure 13:
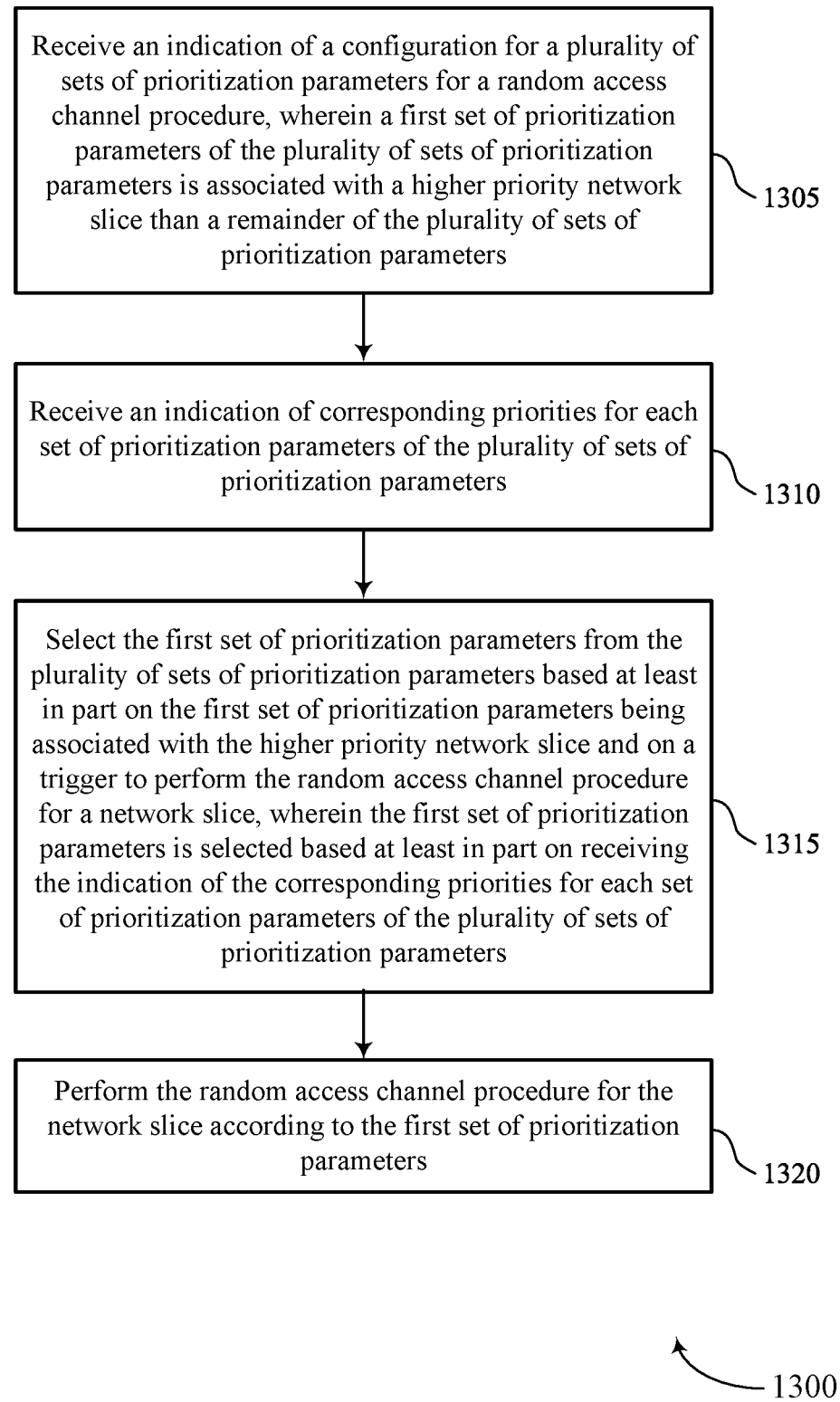

FIG. 13 shows a flowchart illustrating a method 1300 that supports techniques for prioritizing multiple sets of random access channel parameters in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The operations of 1305 may be performed in accordance with examples as disclosed herein. In some examples, aspects of the operations of 1305 may be performed by a prioritization parameter set configuration component 625 as described with reference to FIG. 6.

At 1310, the method may include receiving an indication of corresponding priorities for each set of prioritization parameters of the multiple sets of prioritization parameters. The operations of 1310 may be performed in accordance with examples as disclosed herein. In some examples, aspects of the operations of 1310 may be performed by a set priority configuration component 640 as described with reference to FIG. 6.

At 1315, the method may include selecting the first set of prioritization parameters from the multiple sets of prioritization parameters based on the first set of prioritization parameters being associated with the higher priority network slice and on a trigger to perform the random access channel procedure for a network slice, where the first set of prioritization parameters is selected based on receiving the indication of the corresponding priorities for each set of prioritization parameters of the multiple sets of prioritization parameters. The operations of 1315 may be performed in accordance with examples as disclosed herein. In some examples, aspects of the operations of 1315 may be performed by a prioritization parameter set selection component 630 as described with reference to FIG. 6.

At 1320, the method may include performing the random access channel procedure for the network slice according to the first set of prioritization parameters. The operations of 1320 may be performed in accordance with examples as disclosed herein. In some examples, aspects of the operations of 1320 may be performed by a random access channel procedure component 635 as described with reference to FIG. 6.

Figure 14:
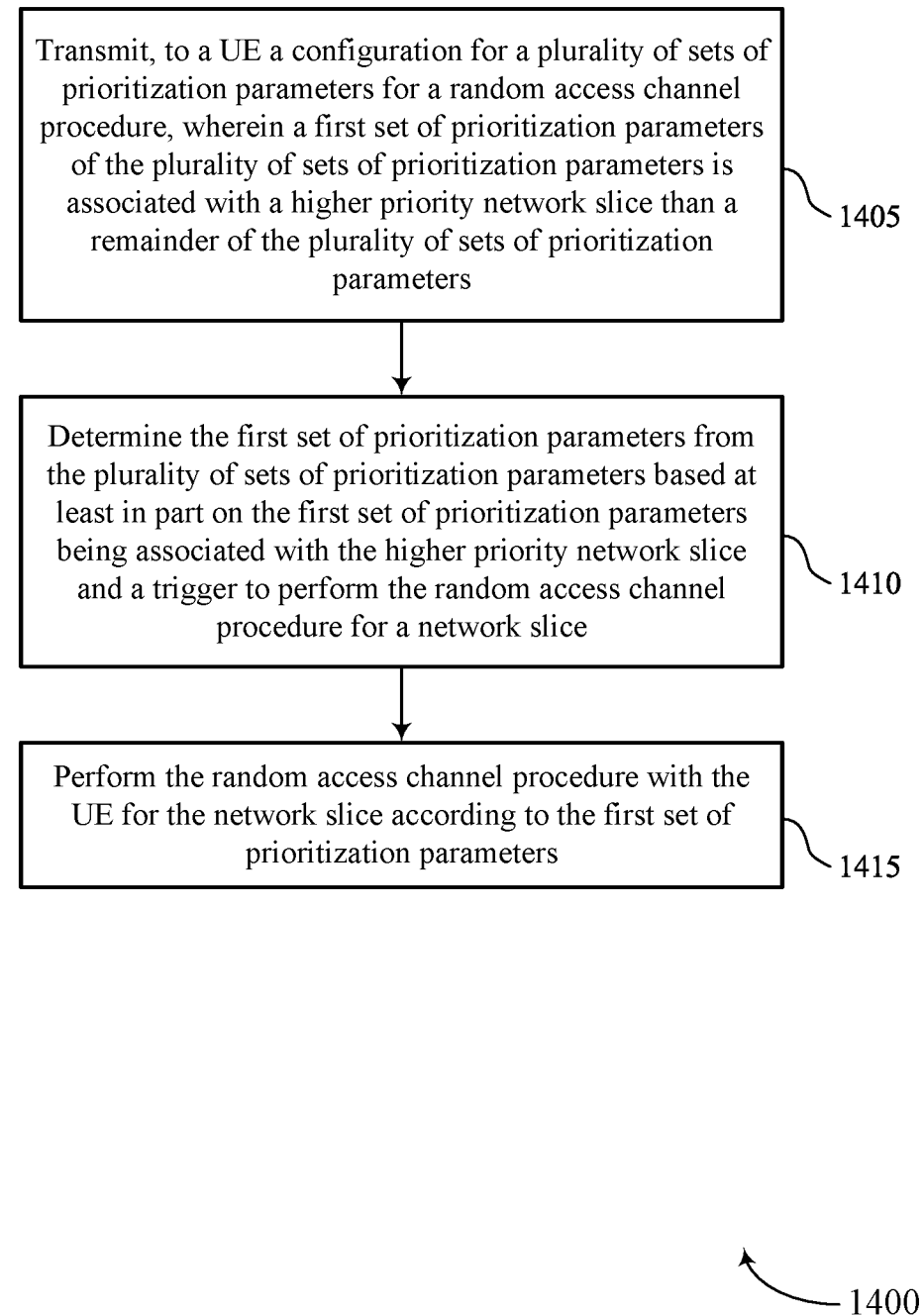

FIG. 14 shows a flowchart illustrating a method 1400 that supports techniques for prioritizing multiple sets of random access channel parameters in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The operations of 1405 may be performed in accordance with examples as disclosed herein. In some examples, aspects of the operations of 1405 may be performed by a prioritization parameter set configuring component 1025 as described with reference to FIG. 10.

At 1410, the method may include determining the first set of prioritization parameters from the multiple sets of prioritization parameters based on the first set of prioritization parameters being associated with the higher priority network slice and a trigger to perform the random access channel procedure for a network slice. The operations of 1410 may be performed in accordance with examples as disclosed herein. In some examples, aspects of the operations of 1410 may be performed by a prioritization parameter set determining component 1030 as described with reference to FIG. 10.

At 1415, the method may include performing the random access channel procedure with the UE for the network slice according to the first set of prioritization parameters. The operations of 1415 may be performed in accordance with examples as disclosed herein. In some examples, aspects of the operations of 1415 may be performed by a random access channel procedure component 1035 as described with reference to FIG. 10.

Figure 15:
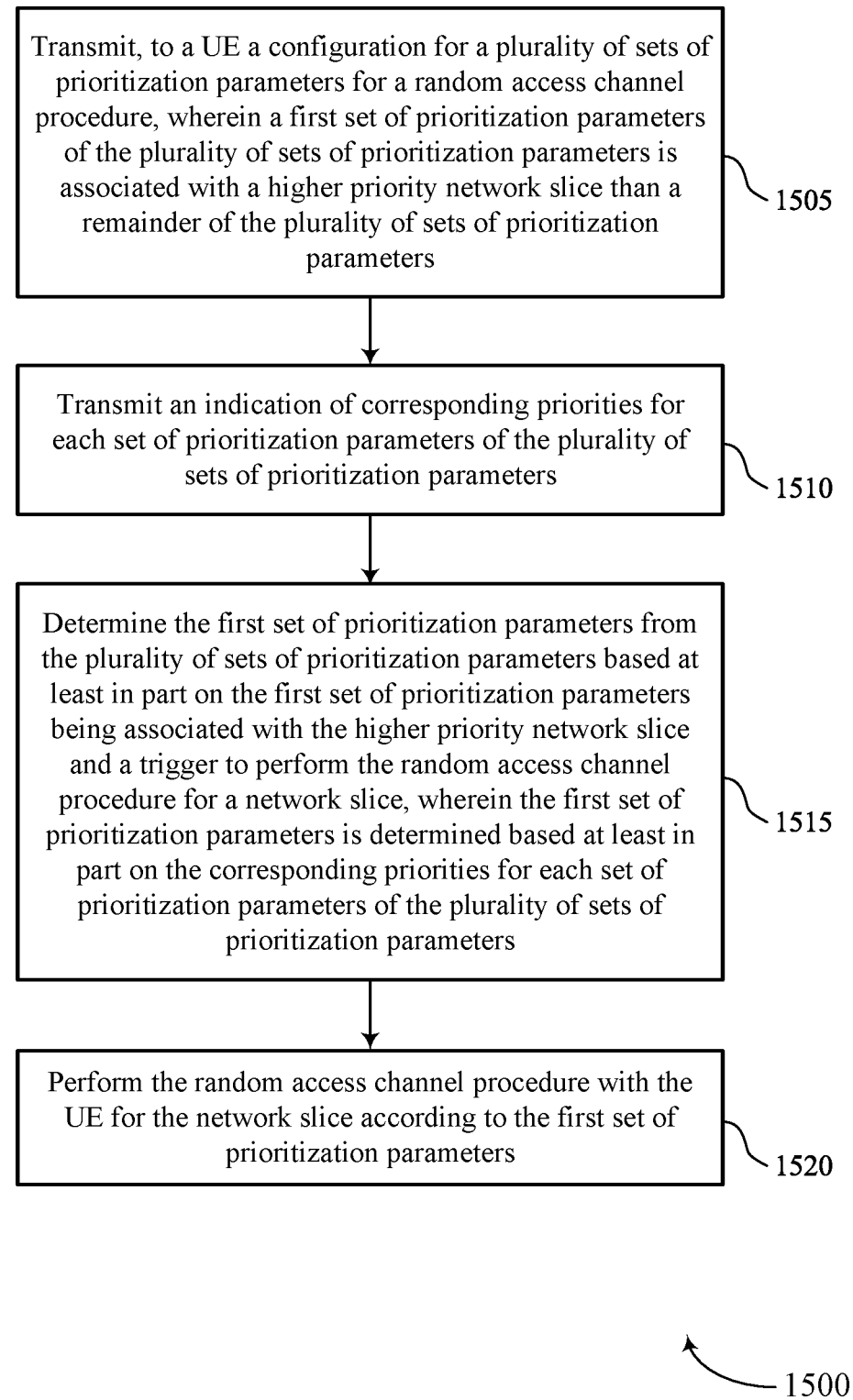

FIG. 15 shows a flowchart illustrating a method 1500 that supports techniques for prioritizing multiple sets of random access channel parameters in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication of a configuration for multiple sets of prioritization parameters for a random access channel procedure, where a first set of prioritization parameters of the multiple sets of prioritization parameters is associated with a higher priority network slice than a remainder of the multiple sets of prioritization parameters. The operations of 1505 may be performed in accordance with examples as disclosed herein. In some examples, aspects of the operations of 1505 may be performed by a prioritization parameter set configuring component 1025 as described with reference to FIG. 10.

At 1510, the method may include transmitting an indication of corresponding priorities for each set of prioritization parameters of the multiple sets of prioritization parameters. The operations of 1510 may be performed in accordance with examples as disclosed herein. In some examples, aspects of the operations of 1510 may be performed by a set priority configuring component 1040 as described with reference to FIG. 10.

At 1515, the method may include determining the first set of prioritization parameters from the multiple sets of prioritization parameters based on the first set of prioritization parameters being associated with the higher priority network slice and a trigger to perform the random access channel procedure for a network slice, where the first set of prioritization parameters is determined based on the corresponding priorities for each set of prioritization parameters of the multiple sets of prioritization parameters. The operations of 1515 may be performed in accordance with examples as disclosed herein. In some examples, aspects of the operations of 1515 may be performed by a prioritization parameter set determining component 1030 as described with reference to FIG. 10.

At 1520, the method may include performing the random access channel procedure with the UE for the network slice according to the first set of prioritization parameters. The operations of 1520 may be performed in accordance with examples as disclosed herein. In some examples, aspects of the operations of 1520 may be performed by a random access channel procedure component 1035 as described with reference to FIG. 10.

The following provides an overview of aspects of the present disclosure:

Aspect 1: A method for wireless communication at a UE, comprising: receiving an indication of a configuration for a plurality of sets of prioritization parameters for a random access channel procedure, wherein a first set of prioritization parameters of the plurality of sets of prioritization parameters is associated with a higher priority network slice than a remainder of the plurality of sets of prioritization parameters; selecting the first set of prioritization parameters from the plurality of sets of prioritization parameters based at least in part on the first set of prioritization parameters being associated with the higher priority network slice and on a trigger to perform the random access channel procedure for a network slice; and performing the random access channel procedure for the network slice according to the first set of prioritization parameters.

Aspect 2: The method of aspect 1, further comprising: receiving an indication of corresponding priorities for each set of prioritization parameters of the plurality of sets of prioritization parameters, wherein the first set of prioritization parameters is selected based at least in part on receiving the indication of the corresponding priorities for each set of prioritization parameters of the plurality of sets of prioritization parameters.

Aspect 3: The method of aspect 2, wherein receiving the indication of the corresponding priorities comprises: receiving the indication of the corresponding priorities for each set of prioritization parameters via system information, radio resource control signaling, non-access stratum signaling, or any combination thereof.

Aspect 4: The method of any of aspects 1 through 3, wherein receiving the indication of the configuration comprises: receiving the indication of the configuration via a system information block, radio resource control signaling, non-access stratum signaling, or any combination thereof.

Aspect 5: The method of any of aspects 1 through 4, wherein each set of prioritization parameters of the plurality of sets of prioritization parameters is associated with a handover procedure, a beam failure recovery procedure, multimedia priority service signaling, mission critical service signaling, one or more access identities, one or more network slides, or one or more access categories, or any combination thereof.

Aspect 6: The method of any of aspects 1 through 5, further comprising: receiving, via a system information block, a first indication of a first priority for the first set of prioritization parameters; and receiving, via radio resource control signaling, a second indication of a second priority for the first set of prioritization parameters, wherein the random access channel procedure is performed according to the first set of prioritization parameters based at least in part on receiving the second indication of the second priority.

Aspect 7: The method of any of aspects 1 through 6, wherein each of the set of prioritization parameters includes a preamble ramping step, a backoff scaling factor, a listen before talk configuration, or a channel access priority, or any combination thereof.

Aspect 8: The method of any of aspects 1 through 7, further comprising: identifying one or more prioritization parameters of the first set of prioritization parameters based at least in part on the indication of the configuration; and determining one or more cell-specific parameters for a remaining one or more prioritization parameters of the first set of prioritization parameters, wherein the random access channel procedure is performed based at least in part on the determining.

Aspect 9: The method of any of aspects 1 through 8, further comprising: receiving, from a base station, an indication of the higher priority network slice and the first set of prioritization parameters, wherein the first set of prioritization parameters is selected based at least in part on receiving the indication.

Aspect 10: The method of any of aspects 1 through 9, further comprising: determining a priority ordering for the plurality of sets of prioritization parameters, wherein the priority ordering includes multimedia priority service and mission critical service random access channel procedures as a first priority, a network slice-specific and access category-specific random access channel procedures as a second priority lower than the first priority, an access identity-specific random access channel procedures as a third priority lower than the second priority, and a handover-specific and beam failure recovery-specific random access channel procedures as a fourth priority lower than the third priority.

Aspect 11: The method of any of aspects 1 through 10, wherein the configuration for the plurality of sets of prioritization parameters indicates a corresponding network slice for each set of prioritization parameters based at least in part on network slice selection assistance information, a single network slice selection assistance information, a slice or service type, a set of single network slice selection assistance information, or any combination thereof.

Aspect 12: A method for wireless communication at a base station, comprising: transmitting, to a UE, an indication of a configuration for a plurality of sets of prioritization parameters for a random access channel procedure, wherein a first set of prioritization parameters of the plurality of sets of prioritization parameters is associated with a higher priority network slice than a remainder of the plurality of sets of prioritization parameters; determining the first set of prioritization parameters from the plurality of sets of prioritization parameters based at least in part on the first set of prioritization parameters being associated with the higher priority network slice and a trigger to perform the random access channel procedure for a network slice; and performing the random access channel procedure with the UE for the network slice according to the first set of prioritization parameters.

Aspect 13: The method of aspect 12, further comprising: transmitting an indication of corresponding priorities for each set of prioritization parameters of the plurality of sets of prioritization parameters, wherein the first set of prioritization parameters is determined based at least in part on the corresponding priorities for each set of prioritization parameters of the plurality of sets of prioritization parameters.

Aspect 14: The method of aspect 13, wherein transmitting the indication of the corresponding priorities comprises: transmitting the indication of the corresponding priorities for each set of prioritization parameters via system information, radio resource control signaling, non-access stratum signaling, or any combination thereof.

Aspect 15: The method of any of aspects 12 through 14, wherein transmitting the indication of the configuration comprises: transmitting the indication of the configuration via a system information block, radio resource control signaling, non-access stratum signaling, or any combination thereof.

Aspect 16: The method of any of aspects 12 through 15, wherein each set of prioritization parameters of the plurality of sets of prioritization parameters is associated with a handover procedure, a beam failure recovery procedure, multimedia priority service signaling, mission critical service signaling, one or more access identities, one or more network slides, or one or more access categories, or any combination thereof.

Aspect 17: The method of any of aspects 12 through 16, further comprising: transmitting, via a system information block, a first indication of a first priority for the first set of prioritization parameters; and transmitting, via radio resource control signaling, a second indication of a second priority for the first set of prioritization parameters, wherein the second indication overwrites the first indication.

Aspect 18: The method of any of aspects 12 through 17, wherein each of the set of prioritization parameters includes a preamble ramping step, a backoff scaling factor, a listen before talk configuration, or a channel access priority, or any combination thereof.

Aspect 19: The method of any of aspects 12 through 18, further comprising: identifying one or more prioritization parameters of the first set of prioritization parameters based at least in part on the indication of the configuration; and determining one or more cell-specific parameters for a remaining one or more prioritization parameters of the first set of prioritization parameters, wherein the random access channel procedure is performed based at least in part on the determining.

Aspect 20: The method of any of aspects 12 through 19, further comprising: transmitting, to the UE, an indication of the first set of prioritization parameters from the plurality of sets of prioritization parameters, wherein the first set of prioritization parameters is selected based at least in part on receiving the indication.

Aspect 21: The method of any of aspects 12 through 20, further comprising: determining a priority ordering for the plurality of sets of prioritization parameters, wherein the priority ordering includes multimedia priority service and mission critical service random access channel procedures as a highest priority, then network slice-specific and access category-specific random access channel procedures, then access identity-specific random access channel procedures, then handover-specific and beam failure recovery-specific random access channel procedures.

Aspect 22: The method of any of aspects 12 through 21, wherein the configuration for the plurality of sets of prioritization parameters indicates a corresponding network slice for each set of prioritization parameters based at least in part on network slice selection assistance information, a single network slice selection assistance information, a slice or service type, a set of single network slice selection assistance information, or any combination thereof.

Aspect 23: The method of any of aspects 12 through 22, further comprising: receiving, from a network entity, an indication of one or more network slice identifiers, one or more network slice group identifiers, one or more access category identifiers, one or more access category group identifiers, or one or more random access prioritization parameter set identifiers, or any combination thereof, wherein the first set of prioritization parameters is determined based at least in part on receiving the indication from the network entity.

Aspect 24: An apparatus for wireless communication at a UE, comprising a processor; memory coupled with the processor; and instructions stored in the memory and executable by the processor to cause the apparatus to perform a method of any of aspects 1 through 11.

Aspect 25: An apparatus for wireless communication at a UE, comprising at least one means for performing a method of any of aspects 1 through 11.

Aspect 26: A non-transitory computer-readable medium storing code for wireless communication at a UE, the code comprising instructions executable by a processor to perform a method of any of aspects 1 through 11.

Aspect 27: An apparatus for wireless communication at a base station, comprising a processor; memory coupled with the processor; and instructions stored in the memory and executable by the processor to cause the apparatus to perform a method of any of aspects 12 through 23.

Aspect 28: An apparatus for wireless communication at a base station, comprising at least one means for performing a method of any of aspects 12 through 23.

Aspect 29: A non-transitory computer-readable medium storing code for wireless communication at a base station, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving an indication configuring the UE to prioritize random access procedures associated with one or more network slices, the indication including a configuration for a plurality of sets of prioritization parameters for random access channel procedures, wherein a first set of prioritization parameters of the plurality of sets of prioritization parameters is associated with a higher priority network slice than a remainder of the plurality of sets of prioritization parameters;
    selecting, for a random access channel procedure for a network slice of the one or more network slices, the first set of prioritization parameters from the plurality of sets of prioritization parameters based at least in part on the indication configuring the UE to prioritize random access procedures associated with the one or more network slices and on a trigger to perform the random access channel procedure for the network slice of the one or more network slices; and
    performing the random access channel procedure for the network slice according to the first set of prioritization parameters.

2. The method of claim 1, further comprising:
    receiving an indication of corresponding priorities for each set of prioritization parameters of the plurality of sets of prioritization parameters, wherein the first set of prioritization parameters is selected based at least in part on receiving the indication of the corresponding priorities for each set of prioritization parameters of the plurality of sets of prioritization parameters.

3. The method of claim 2, wherein receiving the indication of the corresponding priorities comprises:
    receiving the indication of the corresponding priorities for each set of prioritization parameters via system information, radio resource control signaling, non-access stratum signaling, or any combination thereof.

4. The method of claim 1, wherein receiving the indication of the configuration comprises:
    receiving the indication configuring the UE to prioritize random access procedures associated with the one or more network slices via a system information block, radio resource control signaling, non-access stratum signaling, or any combination thereof.

5. The method of claim 1, wherein each set of prioritization parameters of the plurality of sets of prioritization parameters is associated with a handover procedure, a beam failure recovery procedure, multimedia priority service signaling, mission critical service signaling, one or more access identities, the one or more network slices, or one or more access categories, or any combination thereof.

6. The method of claim 1, further comprising:
    receiving, via a system information block, a first indication of a first priority for the first set of prioritization parameters; and
    receiving, via radio resource control signaling, a second indication of a second priority for the first set of prioritization parameters, wherein the random access channel procedure is performed according to the first set of prioritization parameters based at least in part on receiving the second indication of the second priority.

7. The method of claim 1, wherein each set of prioritization parameters of the plurality of sets of prioritization parameters includes a preamble ramping step, a backoff scaling factor, a listen before talk configuration, or a channel access priority, or any combination thereof.

8. The method of claim 1, further comprising:
    identifying one or more prioritization parameters of the first set of prioritization parameters based at least in part on the indication configuring the UE to prioritize random access procedures associated with the one or more network slices; and
    determining one or more cell-specific parameters for a remaining one or more prioritization parameters of the first set of prioritization parameters, wherein the random access channel procedure is performed based at least in part on the determining.

9. The method of claim 1, further comprising:
    receiving, from a network device, an indication of the higher priority network slice and the first set of prioritization parameters, wherein the first set of prioritization parameters is selected based at least in part on receiving the indication.

10. The method of claim 1, further comprising:
    determining a priority ordering for the plurality of sets of prioritization parameters, wherein the priority ordering includes multimedia priority service and mission critical service random access channel procedures as a first priority, a network slice-specific and access category-specific random access channel procedures as a second priority lower than the first priority, an access identity-specific random access channel procedures as a third priority lower than the second priority, and a handover-specific and beam failure recovery-specific random access channel procedures as a fourth priority lower than the third priority.

11. The method of claim 1, wherein the configuration for the plurality of sets of prioritization parameters indicates a corresponding network slice for each set of prioritization parameters based at least in part on network slice selection assistance information, a single network slice selection assistance information, a slice or service type, a set of single network slice selection assistance information, or any combination thereof.

12. A method for wireless communication at a network device, comprising:
    transmitting, to a user equipment (UE), an indication configuring the UE to prioritize random access procedures associated with one or more network slices, the indication including a configuration for a plurality of sets of prioritization parameters for random access channel procedures, wherein a first set of prioritization parameters of the plurality of sets of prioritization parameters is associated with a higher priority network slice than a remainder of the plurality of sets of prioritization parameters;
    determining the first set of prioritization parameters from the plurality of sets of prioritization parameters based at least in part on the indication configuring the UE to prioritize random access procedures associated with the one or more network slices and on a trigger to perform a random access channel procedure for a network slice of the one or more network slices; and
    performing the random access channel procedure with the UE for the network slice according to the first set of prioritization parameters based at least in part on the indication configuring the UE to prioritize random access procedures associated with the one or more network slices.

13. The method of claim 12, further comprising:
    transmitting an indication of corresponding priorities for each set of prioritization parameters of the plurality of sets of prioritization parameters, wherein the first set of prioritization parameters is determined based at least in part on the corresponding priorities for each set of prioritization parameters of the plurality of sets of prioritization parameters.

14. The method of claim 13, wherein transmitting the indication of the corresponding priorities comprises:
    transmitting the indication of the corresponding priorities for each set of prioritization parameters via system information, radio resource control signaling, non-access stratum signaling, or any combination thereof.

15. The method of claim 12, wherein transmitting the indication comprises:
    transmitting the indication configuring the UE to prioritize random access procedures associated with the one or more network slices via a system information block, radio resource control signaling, non-access stratum signaling, or any combination thereof.

16. The method of claim 12, wherein each set of prioritization parameters of the plurality of sets of prioritization parameters is associated with a handover procedure, a beam failure recovery procedure, multimedia priority service signaling, mission critical service signaling, one or more access identities, the one or more network slices, or one or more access categories, or any combination thereof.

17. The method of claim 12, further comprising:
    transmitting, via a system information block, a first indication of a first priority for the first set of prioritization parameters; and
    transmitting, via radio resource control signaling, a second indication of a second priority for the first set of prioritization parameters, wherein the second indication overwrites the first indication.

18. The method of claim 12, wherein each set of prioritization parameters of the plurality of sets of prioritization parameters includes a preamble ramping step, a backoff scaling factor, a listen before talk configuration, or a channel access priority, or any combination thereof.

19. The method of claim 12, further comprising:
    identifying one or more prioritization parameters of the first set of prioritization parameters based at least in part on the indication configuring the UE to prioritize random access procedures associated with the one or more network slices; and
    determining one or more cell-specific parameters for a remaining one or more prioritization parameters of the first set of prioritization parameters, wherein the random access channel procedure is performed based at least in part on the determining.

20. The method of claim 12, further comprising:
    transmitting, to the UE, an indication of the first set of prioritization parameters from the plurality of sets of prioritization parameters, wherein the first set of prioritization parameters is selected based at least in part on receiving the indication.

21. The method of claim 12, further comprising:
    determining a priority ordering for the plurality of sets of prioritization parameters, wherein the priority ordering includes multimedia priority service and mission critical service random access channel procedures as a highest priority, then network slice-specific and access category-specific random access channel procedures, then access identity-specific random access channel procedures, then handover-specific and beam failure recovery-specific random access channel procedures.

22. The method of claim 12, wherein the configuration for the plurality of sets of prioritization parameters indicates a corresponding network slice for each set of prioritization parameters based at least in part on network slice selection assistance information, a single network slice selection assistance information, a slice or service type, a set of single network slice selection assistance information, or any combination thereof.

23. The method of claim 12, further comprising:
    receiving, from a network entity, an indication of one or more network slice identifiers, one or more network slice group identifiers, one or more access category identifiers, one or more access category group identifiers, or one or more random access prioritization parameter set identifiers, or any combination thereof, wherein the first set of prioritization parameters is determined based at least in part on receiving the indication from the network entity.

24. An apparatus for wireless communication at a user equipment (UE), comprising:
    a processor;
    memory coupled with the processor; and
    instructions stored in the memory and executable by the processor to cause the apparatus to:
        receive an indication configuring the UE to prioritize random access procedures associated with one or more network slices, the indication including a configuration for a plurality of sets of prioritization parameters for random access channel procedures, wherein a first set of prioritization parameters of the plurality of sets of prioritization parameters is associated with a higher priority network slice than a remainder of the plurality of sets of prioritization parameters;
        select, for a random access channel procedure for a network slice of the one or more network slices, the first set of prioritization parameters from the plurality of sets of prioritization parameters based at least in part on the indication configuring the UE to prioritize random access procedures associated with the one or more network slices and on a trigger to perform the random access channel procedure for the network slice of the one or more network slices; and perform the random access channel procedure for the network slice according to the first set of prioritization parameters.

25. The apparatus of claim 24, wherein the instructions are further executable by the processor to cause the apparatus to:

receive an indication of corresponding priorities for each set of prioritization parameters of the plurality of sets of prioritization parameters, wherein the first set of prioritization parameters is selected based at least in part on receiving the indication of the corresponding priorities for each set of prioritization parameters of the plurality of sets of prioritization parameters.

26. The apparatus of claim 24, wherein the instructions are further executable by the processor to cause the apparatus to:

receive, via a system information block, a first indication of a first priority for the first set of prioritization parameters; and receive, via radio resource control signaling, a second indication of a second priority for the first set of prioritization parameters, wherein the random access channel procedure is performed according to the first set of prioritization parameters based at least in part on receiving the second indication of the second priority.

27. The apparatus of claim 24, wherein the instructions are further executable by the processor to cause the apparatus to:

identify one or more prioritization parameters of the first set of prioritization parameters based at least in part on the indication of the configuration; and determine one or more cell-specific parameters for a remaining one or more prioritization parameters of the first set of prioritization parameters, wherein the random access channel procedure is performed based at least in part on the determining.

28. The apparatus of claim 24, wherein the instructions are further executable by the processor to cause the apparatus to:

receive, from a network device, an indication of the higher priority network slice and the first set of prioritization parameters, wherein the first set of prioritization parameters is selected based at least in part on receiving the indication.

29. An apparatus for wireless communication at a network device, comprising:

a processor;

memory coupled with the processor; and instructions stored in the memory and executable by the processor to cause the apparatus to:

transmit, to a user equipment (UE), and indication configuring the UE to prioritize random access procedures associated with one or more network slices, the indication including a configuration for a plurality of sets of prioritization parameters for random access channel procedures, wherein a first set of prioritization parameters of the plurality of sets of prioritization parameters is associated with a higher priority network slice than a remainder of the plurality of sets of prioritization parameters;

determine the first set of prioritization parameters from the plurality of sets of prioritization parameters based at least in part on the indication configuring the UE to prioritize random access procedures associated with the one or more network slices and on a trigger to perform a random access channel procedure for a network slice of the one or more network slices; and perform the random access channel procedure with the UE for the network slice according to the first set of prioritization parameters based at least in part on the indication configuring the UE to prioritize random access procedures associated with the one or more network slices.

30. The apparatus of claim 29, wherein the instructions are further executable by the processor to cause the apparatus to:

transmit an indication of corresponding priorities for each set of prioritization parameters of the plurality of sets of prioritization parameters, wherein the first set of prioritization parameters is determined based at least in part on the corresponding priorities for each set of prioritization parameters of the plurality of sets of prioritization parameters.

\* \* \* \* \*